(12) United States Patent
Audet

(10) Patent No.: US 8,306,982 B2
(45) Date of Patent: Nov. 6, 2012

(54) METHOD FOR ASSOCIATING AND MANIPULATING DOCUMENTS WITH AN OBJECT

(75) Inventor: Mathieu Audet, Montreal (CA)

(73) Assignee: Maya-Systems Inc., Montreal (CA)

( * ) Notice: Subject to any disclaimer, the term of this patent is extended or adjusted under 35 U.S.C. 154(b) by 0 days.

(21) Appl. No.: 13/217,055

(22) Filed: Aug. 24, 2011

(65) Prior Publication Data

US 2011/0307814 A1    Dec. 15, 2011

Related U.S. Application Data

(62) Division of application No. 12/466,936, filed on May 15, 2009.

(60) Provisional application No. 61/053,242, filed on May 15, 2008.

(51) Int. Cl.
*G06F 17/30* (2006.01)

(52) U.S. Cl. ......... 707/737; 707/709; 707/738; 707/740

(58) Field of Classification Search .................. 707/709, 707/737, 738, 740
See application file for complete search history.

(56) References Cited

U.S. PATENT DOCUMENTS

| | | | |
|---|---|---|---|
| 4,616,336 A | 10/1986 | Robertson | |
| 4,653,021 A | 3/1987 | Takagi | |
| 5,115,504 A | 5/1992 | Belove | |
| 5,148,154 A | 9/1992 | MacKay | |
| 5,241,624 A | 8/1993 | Torres | |
| 5,535,063 A | 7/1996 | Lamming | |
| 5,546,528 A | 8/1996 | Johnston | |
| 5,581,752 A | 12/1996 | Inoue | |
| 5,621,874 A | 4/1997 | Lucas | |
| 5,634,064 A | 5/1997 | Warnock | |
| 5,649,182 A | 7/1997 | Reitz | |
| 5,659,742 A | 8/1997 | Beattie | |
| 5,671,381 A | 9/1997 | Strasnick | |
| 5,680,605 A | 10/1997 | Torres | |
| 5,701,500 A | 12/1997 | Ikeo | |
| 5,713,031 A | 1/1998 | Saito | |
| 5,740,815 A | 4/1998 | Alpins | |
| 5,781,188 A | 7/1998 | Amiot | |

(Continued)

FOREIGN PATENT DOCUMENTS

WO        2005045756        5/2005

OTHER PUBLICATIONS

"Self Organization of a Massive Document Collection", by Kohonen et al., dated May 2000.*

*Primary Examiner* — Mahesh Dwivedi
(74) *Attorney, Agent, or Firm* — Mathieu Audet

(57) ABSTRACT

A non-transitory computer-readable medium adapted to store thereon computer-readable instructions that, when executed with a computer, provide a method for managing information elements in relation with an object on a display of a computer, the method comprising providing an information element, providing a visual distinctive element associated with the information element, providing an object, associating a visual distinctive element at a location on the object and displaying the object on the display, with the associated visual distinctive element thereon, to provide a graphical reference at a location on the object, the visual distinctive element being adapted to draw a link with the information element.

20 Claims, 17 Drawing Sheets

U.S. PATENT DOCUMENTS

| | | | |
|---|---|---|---|
| 5,781,785 A | 7/1998 | Rowe | |
| 5,822,751 A | 10/1998 | Gray | |
| 5,832,504 A | 11/1998 | Tripathi | |
| 5,838,317 A | 11/1998 | Bolnick | |
| 5,847,707 A | 12/1998 | Hayashida | |
| 5,878,410 A | 3/1999 | Zbikowski | |
| 5,900,879 A | 5/1999 | Berry | |
| 5,903,271 A | 5/1999 | Bardon | |
| 5,905,992 A | 5/1999 | Lucas | |
| 5,933,843 A | 8/1999 | Takai | |
| 6,003,034 A | 12/1999 | Tuli | |
| 6,006,227 A | 12/1999 | Freeman | |
| 6,009,442 A | 12/1999 | Chen | |
| 6,012,072 A | 1/2000 | Lucas | |
| 6,029,164 A | 2/2000 | Birrell | |
| 6,064,384 A | 5/2000 | Ho | |
| 6,067,554 A | 5/2000 | Hohensee | |
| 6,081,817 A | 6/2000 | Taguchi | |
| 6,088,032 A | 7/2000 | Mackinlay | |
| 6,108,657 A | 8/2000 | Shoup | |
| 6,111,578 A | 8/2000 | Tesler | |
| 6,119,120 A | 9/2000 | Miller | |
| 6,151,604 A | 11/2000 | Wlaschin | |
| 6,151,702 A | 11/2000 | Overturf | |
| 6,175,845 B1 | 1/2001 | Smith | |
| 6,185,551 B1 | 2/2001 | Birrell | |
| 6,189,012 B1 | 2/2001 | Mital | |
| 6,202,068 B1 | 3/2001 | Kraay | |
| 6,240,421 B1 | 5/2001 | Stolarz | |
| 6,243,093 B1 | 6/2001 | Czerwinski | |
| 6,243,724 B1 | 6/2001 | Mander | |
| 6,253,218 B1 | 6/2001 | Aoki | |
| 6,289,362 B1 | 9/2001 | Van Der Meer | |
| 6,295,639 B1 | 9/2001 | Van Der Meer | |
| 6,308,187 B1 | 10/2001 | DeStefano | |
| 6,337,698 B1 | 1/2002 | Keely, Jr. et al. | |
| 6,388,665 B1 | 5/2002 | Linnett | |
| 6,392,651 B1 | 5/2002 | Stradley | |
| 6,457,017 B2 | 9/2002 | Watkins | |
| 6,463,431 B1 | 10/2002 | Schmitt | |
| 6,538,672 B1 | 3/2003 | Dobbelaar | |
| 6,553,310 B1 | 4/2003 | Lopke | |
| 6,662,357 B1 | 12/2003 | Bowman-Amuah | |
| 6,678,694 B1 | 1/2004 | Zimmermann | |
| 6,754,660 B1 | 6/2004 | MacPhail | |
| 6,889,220 B2 | 5/2005 | Wolff | |
| 6,915,489 B2 | 7/2005 | Gargi | |
| 6,948,124 B2 | 9/2005 | Combs | |
| 6,987,220 B2 | 1/2006 | Holcombe | |
| 7,007,034 B1 | 2/2006 | Hartman | |
| 7,020,848 B2 | 3/2006 | Rosenzweig | |
| 7,055,104 B1 | 5/2006 | Billmaier | |
| 7,149,983 B1 | 12/2006 | Robertson | |
| 7,199,809 B1 | 4/2007 | Lacy | |
| 7,234,114 B2 | 6/2007 | Kurtz | |
| 7,334,191 B1 | 2/2008 | Sivan | |
| 7,346,600 B2 | 3/2008 | Nakao | |
| 7,353,461 B2 | 4/2008 | Davidsson | |
| 7,418,674 B2 | 8/2008 | Robbins | |
| 7,447,999 B1 * | 11/2008 | Robertson et al. | 715/835 |
| 7,606,819 B2 | 10/2009 | Audet | |
| 7,680,817 B2 | 3/2010 | Audet | |
| 7,681,128 B2 | 3/2010 | Yamamoto | |
| 7,765,195 B2 | 7/2010 | Miller | |
| 7,788,247 B2 | 8/2010 | Wang | |
| 2001/0025288 A1 | 9/2001 | Yanase | |
| 2001/0034766 A1 | 10/2001 | Morimoto | |
| 2002/0035563 A1 | 3/2002 | Suda | |
| 2002/0078035 A1 * | 6/2002 | Frank et al. | 707/3 |
| 2002/0087530 A1 | 7/2002 | Smith | |
| 2002/0096831 A1 | 7/2002 | Nakayama | |
| 2002/0101458 A1 | 8/2002 | SanGiovanni | |
| 2003/0093260 A1 | 5/2003 | Dagtas | |
| 2003/0167902 A1 | 9/2003 | Hiner | |
| 2003/0190950 A1 | 10/2003 | Matsumoto | |
| 2004/0103090 A1 * | 5/2004 | Dogl et al. | 707/3 |
| 2004/0111401 A1 | 6/2004 | Chang | |
| 2004/0128277 A1 | 7/2004 | Mander | |
| 2004/0150657 A1 | 8/2004 | Wittenburg | |
| 2004/0233238 A1 | 11/2004 | Lahdesmaki | |
| 2004/0233239 A1 | 11/2004 | Lahdesmaki | |
| 2004/0263519 A1 | 12/2004 | Andrews | |
| 2006/0095852 A1 * | 5/2006 | Trepess et al. | 715/741 |
| 2006/0242178 A1 | 10/2006 | Butterfield | |
| 2006/0248053 A1 * | 11/2006 | Sanfilippo et al. | 707/3 |
| 2006/0248129 A1 | 11/2006 | Carnes | |
| 2006/0259511 A1 | 11/2006 | Boerries | |
| 2007/0005576 A1 | 1/2007 | Cutrell | |
| 2007/0005590 A1 * | 1/2007 | Thrasher | 707/5 |
| 2007/0007884 A1 | 1/2007 | Iwanaga | |
| 2007/0011150 A1 * | 1/2007 | Frank | 707/4 |
| 2007/0061855 A1 | 3/2007 | Serita | |
| 2007/0067290 A1 | 3/2007 | Makela | |
| 2007/0214169 A1 | 9/2007 | Audet | |
| 2007/0216694 A1 | 9/2007 | Audet | |
| 2007/0271508 A1 | 11/2007 | Audet | |
| 2008/0000126 A1 | 1/2008 | Teza | |
| 2008/0022199 A1 | 1/2008 | Sako | |
| 2008/0058106 A1 | 3/2008 | Audet | |
| 2008/0071822 A1 | 3/2008 | Audet | |
| 2008/0072169 A1 | 3/2008 | Audet | |
| 2008/0092038 A1 | 4/2008 | Audet | |
| 2008/0134013 A1 | 6/2008 | Audet | |
| 2008/0134022 A1 | 6/2008 | Audet | |
| 2008/0141115 A1 | 6/2008 | Audet | |
| 2008/0270946 A1 * | 10/2008 | Risch et al. | 715/848 |
| 2008/0295016 A1 | 11/2008 | Audet | |
| 2008/0299989 A1 | 12/2008 | King | |
| 2009/0019371 A1 | 1/2009 | Audet | |
| 2009/0055413 A1 | 2/2009 | Audet | |
| 2009/0055726 A1 | 2/2009 | Audet | |
| 2009/0055729 A1 | 2/2009 | Audet | |
| 2009/0055763 A1 | 2/2009 | Audet | |
| 2009/0055776 A1 | 2/2009 | Audet | |
| 2009/0070662 A1 | 3/2009 | Audet | |
| 2009/0083260 A1 | 3/2009 | Artom | |
| 2009/0228788 A1 | 9/2009 | Audet | |
| 2009/0287693 A1 | 11/2009 | Audet | |
| 2009/0287694 A1 * | 11/2009 | McGowan et al. | 707/5 |
| 2009/0288006 A1 | 11/2009 | Audet | |
| 2010/0082427 A1 | 4/2010 | Burgener | |
| 2010/0082653 A1 | 4/2010 | Nair | |
| 2010/0094890 A1 | 4/2010 | Bokor | |
| 2010/0145976 A1 | 6/2010 | Higgins | |
| 2010/0169823 A1 | 7/2010 | Audet | |
| 2010/0185509 A1 | 7/2010 | Higgins | |
| 2010/0325132 A1 | 12/2010 | Liu | |
| 2010/0325134 A1 | 12/2010 | Galfond | |
| 2010/0332512 A1 | 12/2010 | Shpits | |
| 2010/0333031 A1 | 12/2010 | Castelli | |
| 2011/0078166 A1 | 3/2011 | Oliver | |

* cited by examiner

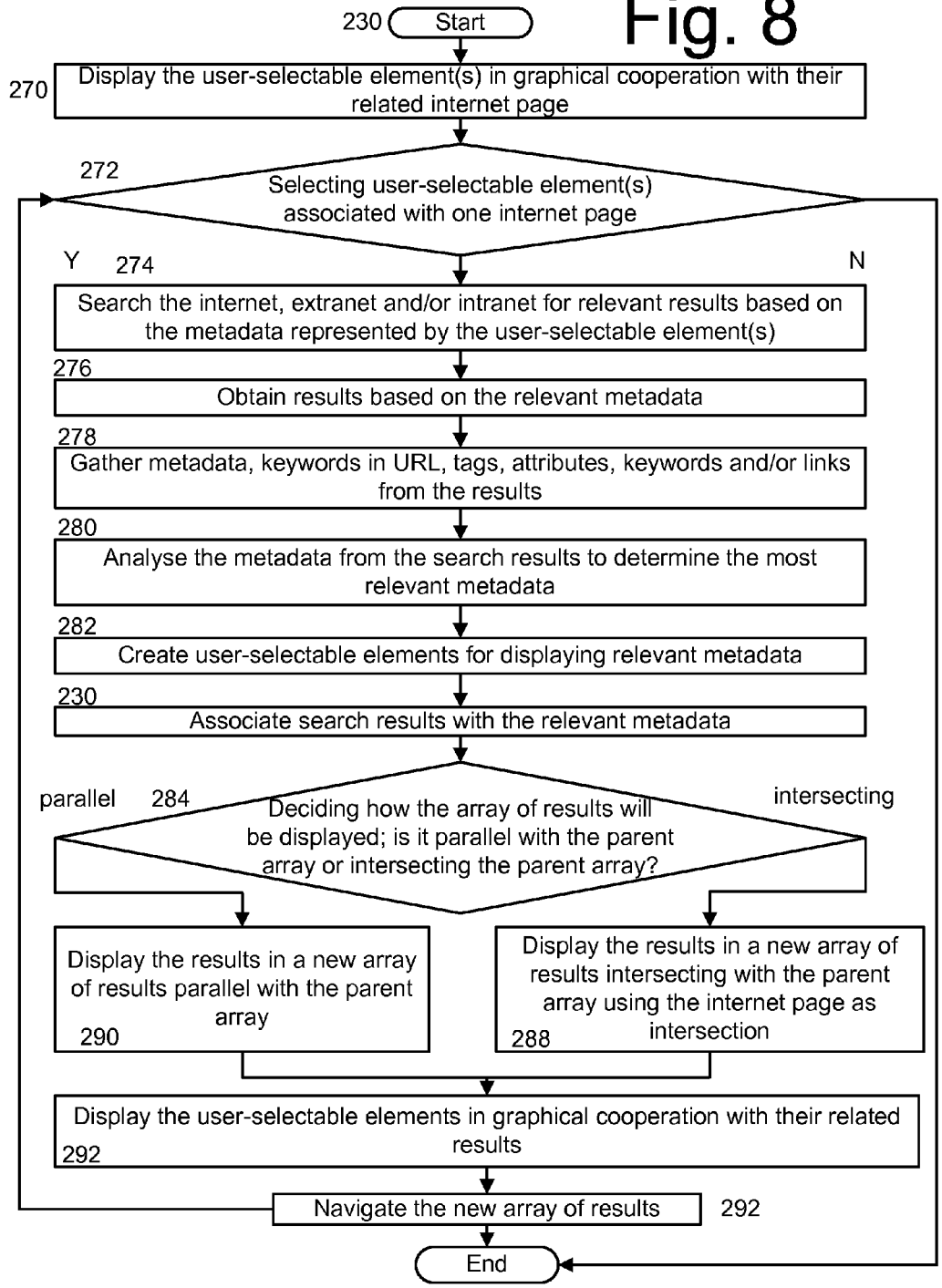

| 330 — Metadata A |                |
|------------------|----------------|
| 332 — Metadata B | Web Page 1     |
| 334 — Metadata C |                |
| 336 — Metadata D | 300            |

| Metadata E |            |
|------------|------------|
| Metadata C | Web Page 3 |
| Metadata J |            |
| Metadata K | 304        |

| Metadata A |            |
|------------|------------|
| Metadata B | Web Page 5 |
| Metadata E |            |
| Metadata D | 308        |

| Metadata E |            |
|------------|------------|
| Metadata C | Web Page 7 |
| Metadata J |            |
| Metadata K | 312        |

| Metadata A |            |
|------------|------------|
| Metadata B | Web Page 9 |
| Metadata C |            |
| Metadata D | 316        |

| Metadata X |             |
|------------|-------------|
| Metadata F | Web Page 11 |
| Metadata J |             |
| Metadata K | 320         |

| Metadata E |            |
|----------------|------------|
| Metadata F     | Web Page 2 |
| Metadata G     |            |
| Metadata C     | 302        |

| Metadata A |            |
|------------|------------|
| Metadata C | Web Page 4 |
| Metadata J |            |
| Metadata K | 306        |

| Metadata E |            |
|------------|------------|
| Metadata B | Web Page 6 |
| Metadata G |            |
| Metadata C | 310        |

| Metadata A |            |
|------------|------------|
| Metadata C | Web Page 8 |
| Metadata E |            |
| Metadata K | 314        |

| Metadata E     |             |
|----------------|-------------|
| Metadata F | Web Page 10 |
| Metadata G |             |
| Metadata A     | 318         |

| Metadata A |             |
|------------|-------------|
| Metadata C | Web Page 12 |
| Metadata J |             |
| Metadata K | 322         |

Fig. 9

METHOD FOR ASSOCIATING AND MANIPULATING DOCUMENTS WITH AN OBJECT

CROSS-REFERENCES

The present invention relates to, claims priority from and is a division application of U.S. patent application Ser. No. 12/466,936, filed May 15, 2009, entitled METHOD FOR BUILDING A SEARCH ALGORITHM AND METHOD FOR LINKING DOCUMENTS WITH AN OBJECT, which claims priority from U.S. Provisional Patent Application No. 61/053,242, filed May 15, 2008, entitled METHOD FOR NAVIGATING INTERNET AND METHOD FOR LINKING DOCUMENTS, these documents are incorporated herein by reference.

The present invention also relates to United States Patent Application Publication No.: US 2007/0214169 A1, published Sep. 13, 2007, entitled MULTI-DIMENSIONAL LOCATING SYSTEM AND METHOD and United States Patent Application Publication No.: US 2007/0271508 A1, published Nov. 22, 2007, entitled MULTI-DIMENSIONAL LOCATING SYSTEM AND METHOD. Both of these documents are incorporated herein by reference.

BACKGROUND OF THE INVENTION

1. Field of the Invention

This invention relates generally to computer systems and more specifically to user interfaces and search query definition that facilitate localization and display of search results in relation with an object. This invention also relates to technical document classification and more precisely to engineering and patent documents applied to a graphical representation of an object.

2. Description of the Related Art

Method for Building a Search Algorithm

Internet is a significant source of information. Browsing into such a mass of information remains difficult given search tools that are available. A search tool generally uses keywords to dig into Internet and find relevant Internet pages.

The relevant pages are found and ranked using various techniques depending on the search engine. Most techniques are using data and metadata found in an Internet page. The data is, mostly, the content, often text but not limited thereto, inside the Internet page. The metadata can be of different types, inter alia: registration pages, speed of play of the page, location of the page, HTML title, meta tags, keyword frequency, link popularity.

The tags in the source code usually occur in a particular sequence. If, for example, the Web page consists of a title, a heading, and two paragraphs of text, the tags would be of the sequence: (<html>, <head>, <title>, </title>, </head>, <body>, <h1>, </h1>, <p>, </p>, <p>, </p>, </body>, </html>). The sequence of tags in the source code has one or more sub-sequences, which are generally contiguous portions of the sequence. The sub-sequences can and usually have different lengths, which is the number of tags included in a sub-sequence. The above listed sequence has, for example, the sub-sequence (<title>) and the sub-sequence (<title>, </title>). As can be seen, a sub-sequence can have a length of one tag. The sub-sequences can start at different positions in the sequence. The above listed sequence has, for example, the sub-sequence (</h1>, <p>), which starts at the eighth position in the sequence, and the sub-sequence (<p>, </p>, <p>, </p>), which starts at the ninth position in the sequence. Sub-sequences can overlap with each other, i.e., share common tags. The above listed sequence has, for example, the sub-sequence (<title>, </title>, </head>, <body>, <h1>), and also the sub-sequence (</title>, </head>, <body>, <h1>, </h1>, <p>, </p>). The common tags here are </title>, </head>, <body>, and <h1>. Sequence and sub-sequences are denoted in the instant application by enclosing their elements in parentheticals.

Each sub-sequence of tags is associated with the particular portion of source code that starts and ends with the first tag and the last tag, respectively, of the sub-sequence. The particular portion of source code can define corresponding content of the Web page. The tag in a sub-sequence that includes only one tag is both the first and the last tag.

Each search engine uses its own unique formula, called search algorithm, to index, score and rank web sites. Search engines' algorithms weight various factor, such as a page's design and links, and various other keywords related criterions to rank pages in their search results.

The search engine suggests Internet page results based on the keywords from the user. This implies the user knows how is referred to what s/he is looking for; which is sometimes not exactly the case. It also happens that the search engine provides a list of results from which a few results are relevant to the searcher. Search techniques in the art do not allow the user to tell the search engine which documents are the most relevant such that the search algorithm be modified to focus on the relevant terms/metadata to provide more accurate search results. It could be desirable that a search engine suggests to the user to refine the search based on the most significant terms and/or metadata used in the algorithm. This way, the algorithm could be modified according to the user's input and cooperatively refined to narrow the query and therefore provides better search results.

The same problem can found in databases searches and other data deposits where searches and/or taxonomy is required.

Method for Linking Documents with an Object

Engineers and patent agents are generally using databases to collect and manage documents related to an object, a product or a method. These prior art databases are not drawing intuitive relationship between the document and the product/method. It is actually difficult for a user to make a link between a document and its precise relationship with the product or the method.

Document management systems and method available in the art to organize technical information and patent documents related to a product or a method fail to provide a simple and intuitive way to retrieve documents related to a specific aspect of an object, a product or a method and vice-versa.

Mostly, people that are not familiar with taxonomy or method for classifying documents will have a hard time finding the right documents based on their knowledge of the object, the product or the method.

It is therefore desirable to provide an improved apparatus and an improve method to draw links between documents and an object.

Other deficiencies will become apparent to one skilled in the art to which the invention pertains in view of the following summary and detailed description with its appended figures.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

Method for Building a Search Algorithm

It is one aspect of the present invention to provide the most significant metadata from a document to a user so that the user can select which is the most appropriate metadata according to his/her search, once the selection is done a search engine can build a new query and perform a search, or refine the actual query and perform a search based on the updated query, in accordance with the selected metadata.

One aspect of the present invention provides a means for a user to get suggestions from a search engine about the most significant metadata, tags and/or keywords found inside an Internet page to better build a search query to retrieve related documents.

It is one additional aspect of the present invention to provide user-selectable elements representing metadata from an Internet page.

An aspect of the present invention provides a search engine using inputs from a user selecting suggested metadata, tags and/or keywords found inside an Internet page to refine a search.

An additional aspect of the present invention provides search results in the form of an array from which a user can infer the significance of the results between them by the position they use in the array.

It is an aspect of the present invention to provide user-selectable elements associated with an internet page, the user-selectable elements being adapted to represent the most significant metadata from the internet page and being selectable by the user to improve the accuracy of the search based on suggested wording inspired from the metadata from the internet page.

One other aspect of the present invention provides user-selectable elements displayed in graphical cooperation with a search result, at least some of the user-selectable elements being based on the metadata from the result, a selection of a user-selectable element being adapted to influence a query used to retrieve more relevant search results.

Another aspect of the present invention provides a search method, and/or a search engine adapted to carry on the method, adapted to suggests terms or elements considered in the search query, or algorithm, to the user such that the user can select which are the most relevant terms to help the search engine to refine the query, or algorithm, and provide more accurate search results. The suggested terms or elements can be displayed as user-selected elements such that the searcher can see and select the desired ones. The suggested terms can be reflecting the entire search or can be associated individually with each result. In the latter situation, the displayed terms can consider the metadata or each results to distinguish why each results appears in the results and further help the user to narrow down the search query by improving the search algorithm of the search engine.

Another aspect of the present invention provides a search algorithm that displays relevant algorithm elements collectively or individually associated with the provided search results. The algorithm elements being selectable by a user to help refine the algorithm. Algorithm elements can also include metadata from each search result to better identify which metadata term is the most relevant and be used in the search algorithm.

A computer-readable medium including computer-readable information thereon including instructions providing a method for refining a search algorithm, the method comprising displaying a document, displaying at least one metadata about the search result, receiving instructions about a selection of at least one of the metadata; and modifying a search algorithm by including the selected metadata in the search algorithm.

A computer-implemented method for identifying Web page content, the method comprising receiving a string of HTML source code that includes meta tags, determining the most relevant meta tags, receiving instructions based on the selection of at least one of the most relevant meta tags from a user, modifying a search algorithm, performing a search among web pages content based on the modified algorithm; and displaying search results.

Method for Linking Documents with an Object

The present invention provides a computerized system enabling a graphical link between a graphical representation of a product/method and documents related to the product.

The present invention provides a two dimensional—or a three dimensional—graphical representation (i.e. picture or avatar) of a product and pinpoints the locations on the graphical representation where related documents are available.

The present invention provides a direct link between the pinpoint locations and related documents. The selection of a pinpoints (illustratively) disposed on a precise location on a graphical representation of a product leads to the documents related to this precise area of the product and vice-versa.

The present invention provides a pinpoint mark that can be magnified to display the related document. The global view of the product would show a plurality of pinpoint while magnification of a pinpoint would provide more information about the actual document related to it. The magnification can be progressive so thus would be the increase in the amount of document information so provided.

The present invention provides a user to dispose a pinpoint on an image of a product to draw a link between a document and the product. The pinpoint can be directly disposed onto the desired area or use an arrow to reach the desired area.

The present invention provides a three dimensional rendering of a product adapted to display marks thereon to illustrate areas of the product having documents related thereto. The three dimensional rendering can be moved, rotated, magnified, sliced and change in transparency to allow a user to better see each portion of the product to figure out the exact location of each marks. The marks can use visual distinctive features associated with attributes or tags to improve the distinctiveness there between.

The present invention provides a system and a method for disposing marks on the visual representation of a product associated with patent documents. The selection of the marks being made in accordance with the pertinence of the patent document with the portion of the product where the mark is disposed. The marks can be disposed in accordance with the claimed subject matter or the disclosure contained in the patent document. The marks can also refers to a family of patents and the marks be directed to a system of the product.

The present invention provides a computer interface comprising a graphical representation of an object; and a plurality of pinpoints disposed at specific locations on the object; wherein the selection of a pinpoint provides information about a the document associated with the specific location.

The present invention provides a method to search information based on physical distance comprising selecting a first identifier on the representation of an object; and providing results ordered according to the distance of other identifier on the object.

The present invention provides a non-transitory computer-readable medium adapted to store thereon computer-readable instructions that, when executed with a computer, provide a method for managing information elements in relation with an object on a display of a computer, the method comprising providing an information element, providing a visual distinctive element associated with the information element, providing an object, associating a visual distinctive element at a location on the object and displaying the object on the display, with the associated visual distinctive element thereon, to provide a graphical reference at a location on the object, the visual distinctive element being adapted to draw a link with the information element.

The present invention provides a user-graphical interface on an electronic computing device including a display, the user-graphical element comprising a graphical area adapted to display an object thereon, the object being further adapted to display thereon a plurality of visual distinctive elements at respective locations on the object and further adapted to be respectively associated with information elements, the visual distinctive elements being adapted to provide further information related to their respective information element associated therewith.

These and other advantages and features of the present invention will become apparent from the following description and the attached drawings.

BRIEF DESCRIPTION OF THE DRAWINGS

FIG. 8 is a flow chart of a series of alternate illustrative steps in accordance with an embodiment of the present invention;

FIG. 9 is a schematic illustration of a series of documents with respective associated metadata in accordance with an embodiment of the present invention;

DESCRIPTION OF EMBODIMENT(S) OF THE INVENTION

The present invention is now described with reference to the figures. In the following description, for purposes of explanation, numerous specific details are set forth in order to provide a thorough understanding of the present invention by way of embodiment(s). It may be evident, however, that the present invention may be practiced without these specific details. In other instances, well-known structures and devices are shown in block diagram form in order to facilitate describing the present invention.

The features provided in this specification mainly, but might not exclusively, relate to principles of computer software and machine-readable code/instructions adapted to instruct a computer, many computers or other machines adapted to use the instructions to provide material effects on a display, or other means enabling human-computer interactions to manage documents, menus, user-selectable elements and other computer files. These code/instructions are preferably stored on a machine-readable medium to be read and acted upon to with a computer or a machine having the appropriate code/instructions reading capability.

Exemplary Network

Figure 1:
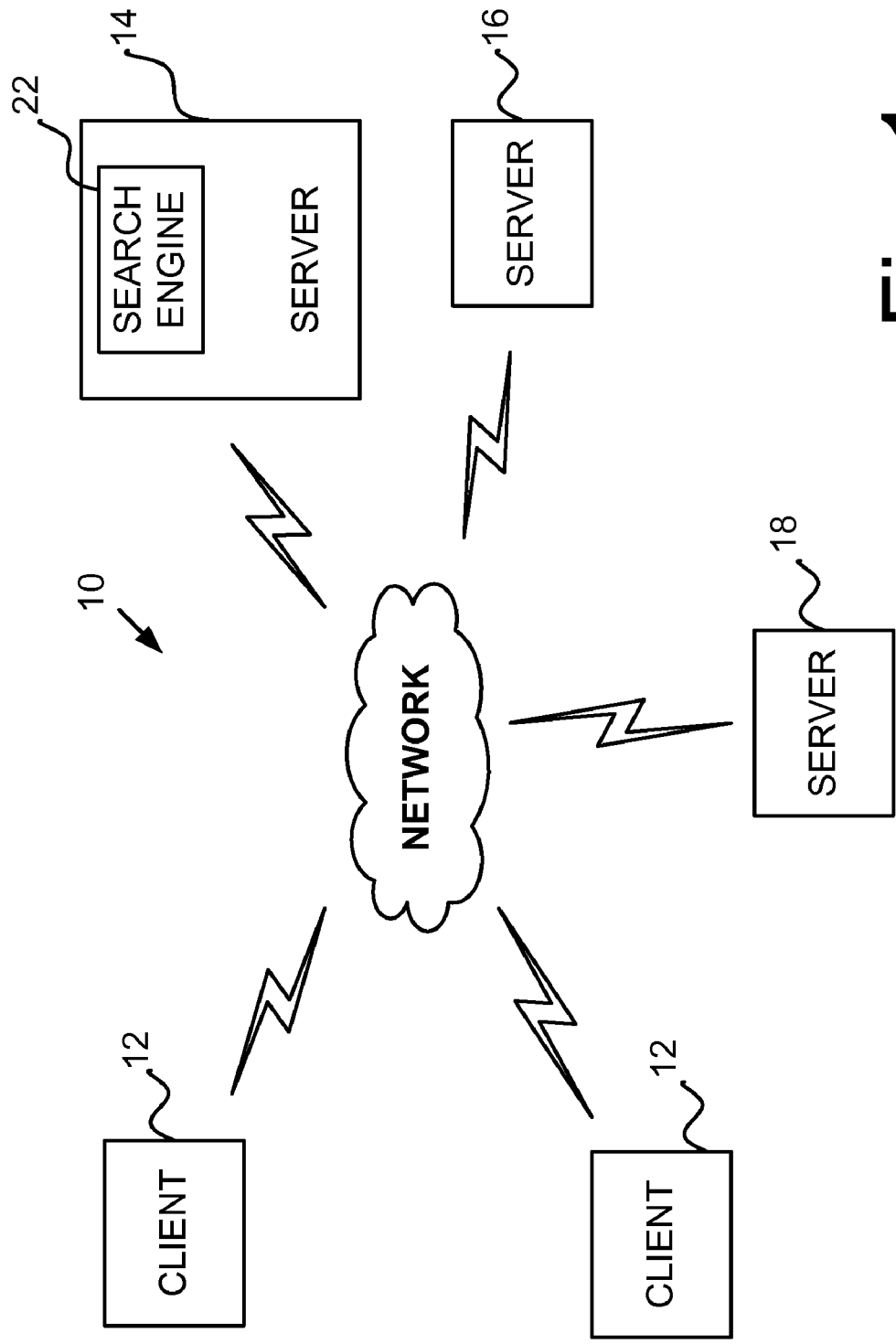
FIG. 1 is a schematic illustration of an exemplary network.

FIG. 1 illustrates an exemplary network 10 in which a system and a method, consistent with the present invention, may be implemented. The network 10 may include multiple client devices 12 connected to multiple servers 14, 16, 18 via a network 20. The network 20 may include a local area network (LAN), a wide area network (WAN), a phone network, such as the Public Switched Phone Network (PSTN), an intranet, the Internet, Wi-Fi, WiMAX or a combination of networks. Two client devices 12 and three servers 14, 16, 18 have been illustrated as connected to network 20 for simplicity. In practice, there may be more or less client devices and servers 14, 16, 18. Also, in some instances, a client 12 device may perform the functions of a server 14, 16, 18 and a server 14, 16, 18 may perform the functions of a client 12 device.

The client devices 12 may include devices, such as mainframes, minicomputers, personal computers, laptops, personal digital assistants, phones, or the like, capable of connecting to the network 20. The client devices 12 may transmit data over the network 20 or receive data from the network 20 via a wired, wireless, or optical connection.

The servers 14, 16, 18 may include one or more types of computer system, such as a mainframe, minicomputer, or personal computer, capable of connecting to the network 20 to enable servers 14, 16, 18 to communicate with the client devices 12. In alternative implementations, the servers 14, 16, 18 may include mechanisms for directly connecting to one or more client devices 12. The servers 14, 16, 18 may transmit data over the network 20 or receive data from the network 20 via a wired, wireless, or optical connection.

In an implementation consistent with the present invention illustratively embodied herein, the server 14 may include a search engine 22 usable by the client devices 12. The servers 14, 16, 18 may store documents, such as web pages, accessible by the client devices 12.

Figure 2:
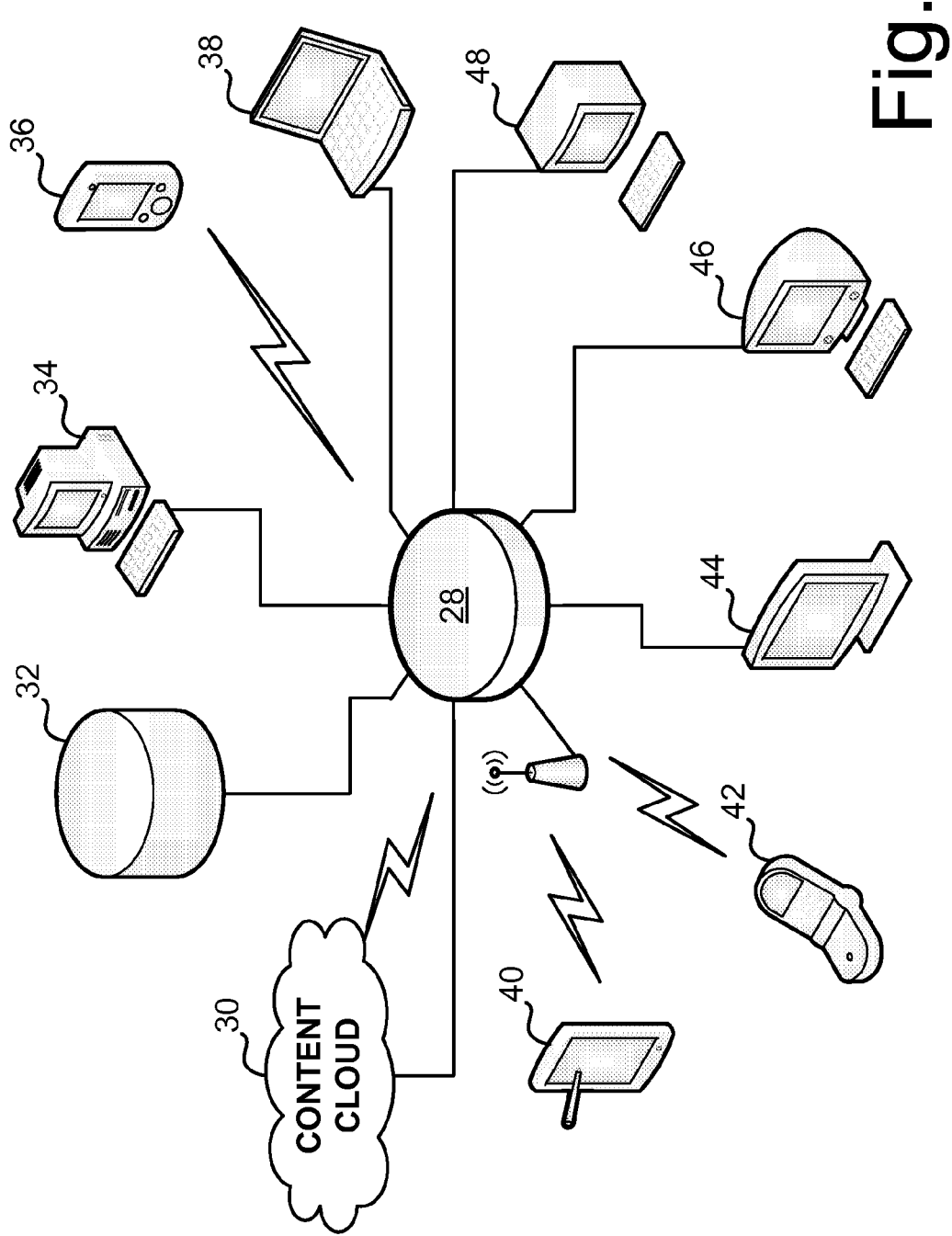
FIG. 2 is a schematic illustration of an alternate exemplary network.

With reference to FIG. 2, a network 20 includes the content cloud 30, a content database 32, content devices 34-38, and other devices 40-48. The network mediator 28 enables network devices 32-48 to communicate with each other without pre-configuring each device. The content cloud 30 represent a content source such as the Internet, where content exists at various locations across the globe that could be reached through a wired connection and/or with a wireless connection. The content includes multimedia content such as audio and video. The mediator 28 allows the content cloud to provide content to devices 34-48. The content database 32 is a storage device that maintains content. The content database 32 may be a stand-alone device on an external communication network. The mediator 28 communicates with the content database 32 to access and retrieve content. The content devices 34-48 include intelligent devices, such as, for example, personal computers, laptops, cell phones and personal digital assistants. The content devices 34-48 are capable or storing content data. The devices 34-48 are intelligent devices that receive content from other content devices 30-48. However, the devices 30-48 can also operate as servers to distribute content to other client devices.

Exemplary Client Architecture

The following discussion provides a brief, general description of an exemplary computer apparatus in which at least some aspects of the present invention may be implemented. The present invention will be described in the general context of computer-executable instructions, such as program modules, being executed by a computerized device. However, the methods of the present invention may be affected by other apparatus. Program modules may include routines, programs, objects, components, data structures, applets, WEB 2.0 type of evolved networked centered applications, etc. that perform a task(s) or implement particular abstract data types. Moreover, those skilled in the art will appreciate that at least some aspects of the present invention may be practiced with other configurations, including hand-held devices, multiprocessor system, microprocessor-based or programmable consumer electronics, network computers, minicomputers, set top boxes, mainframe computers, gaming console and the like. At least some aspects of the present invention may also be practiced in distributed computing environments where tasks are performed by remote processing devices linked through a communications network as exemplified in FIG. 2. In a distributed computing environment, program modules may be located in local and/or remote memory storage devices.

Figure 3:
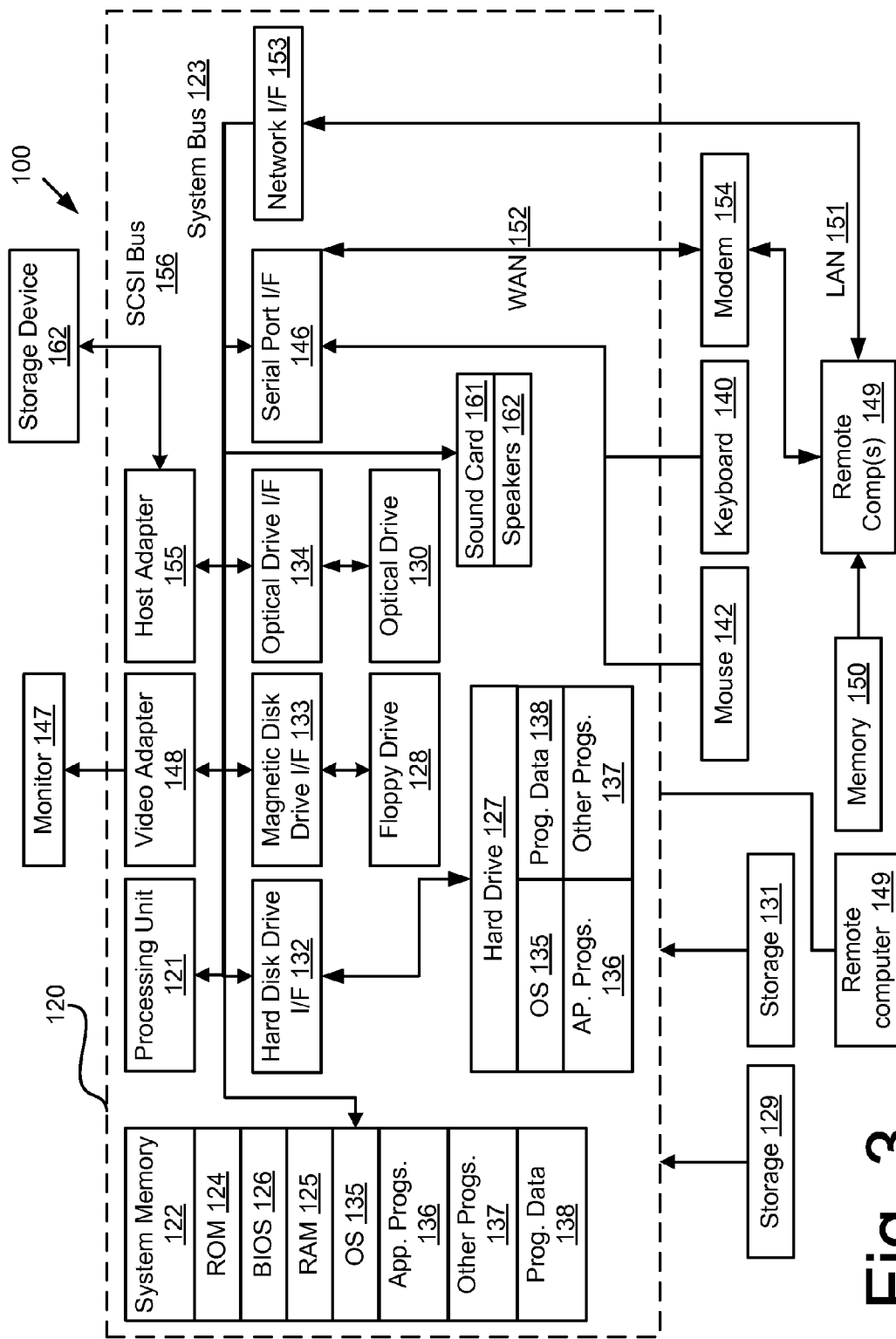
FIG. 3 is a schematic illustration of an exemplary computer system.

With reference to FIG. 3, an exemplary apparatus 100 for implementing at least some aspects of the present invention includes a general purpose computing device in the form of a computer 120 or in the form of a computerized portable apparatus. The computer 120 may include a processing unit 121, a system memory 122, and a system bus 123 that couples various system components, including the system memory 122, to the processing unit 121. The system bus 123 may be any of several types of bus structures including a memory bus or memory controller, a peripheral bus, and a local bus using any of a variety of bus architectures. The system memory may include read only memory (ROM) 124 and/or random access memory (RAM) 125. A basic input/output system 126 (BIOS), containing basic routines that help to transfer data between elements within the computer 120, such as during start-up, may be stored in ROM 124. The computer 120 may also include a hard disk drive 127 for reading from and writing to a hard disk, (not shown), a magnetic disk drive 128 for reading from or writing to a (e.g., removable) magnetic disk 129, and an optical disk drive 130 for reading from or writing to a removable (magneto) optical disk 131 such as a compact disk or other (magneto) optical media. The hard disk drive 127, magnetic disk drive 128, and (magneto) optical disk drive 130 may be coupled with the system bus 123 by a hard disk drive interface 132, a magnetic disk drive interface 133, and a (magneto) optical drive interface 134, respectively.

The drives and their associated storage media provide non-volatile (or persistent) storage of machine readable instructions, data structures, program modules and other data for the computer 120. Although the exemplary environment described herein employs a hard disk, a removable magnetic disk 129 and a removable optical disk 131, these skilled in the art will appreciate that other types of storage media, such as magnetic cassettes, flash memory cards, digital video disks, Bernoulli cartridges, random access memories (RAMs), read only memories (ROM), remote cloud storage and the like, may be used instead of, or in addition to, the storage devices introduced above.

A number of program modules may be stored on the hard disk 127, magnetic disk 129, (magneto) optical disk 131, ROM 124 or RAM 125, such as an operating system 135 (for example, Windows® NT® 4.0, sold by Microsoft® Corporation of Redmond, Wash.), one or more application programs 136, other program modules 137 (such as "Alice", which is a research system developed by the User Interface Group at Carnegie Mellon University available at www.Alice.org, OpenGL from Silicon Graphics Inc. of Mountain View Calif., or Direct 3D from Microsoft Corp. of Bellevue Wash.), and/or program data 138 for example.

A user may enter commands and data into the computer 120 through input devices, such as a keyboard 140, a camera 141 and pointing device 142 for example. Other input devices (not shown) such as a microphone, joystick, game pad, satellite dish, scanner, a touch sensitive screen, accelerometers adapted to sense movements of the user or movements of a device, or the like may also be included. These and other input devices are often connected to the processing unit 121 through a serial port interface 146 coupled to the system bus. However, input devices may be connected by other interfaces, such as a parallel port, a game port, blue tooth connection or a universal serial bus (USB). For example, since the bandwidth of the camera 141 may be too great for the serial port, the video camera 141 may be coupled with the system bus 123 via a video capture card (not shown). The video monitor 147 or other type of display device may also be connected to the system bus 123 via an interface, such as a video adapter 148 for example. The video adapter 148 may include a graphics accelerator. One or more speaker 162 may be connected to the system bus 123 via a sound card 161 (e.g., a wave table synthesizer such as product number AWE64 Gold Card from Creative® Labs of Milpitas, Calif.). In addition to the monitor 147 and speaker(s) 162, the computer 120 may include other peripheral output devices (not shown), such as a printer, a hi-definition television and a scanner for example. As an alternative or an addition to the video monitor 147, a stereo video output device, such as a head mounted display or LCD shutter glasses for example, could be used.

The computer 120 may operate in a networked environment which defines logical connections to one or more remote computers, such as a remote computer 149. The remote computer 149 may be another computer, a server, a router, a network PC, a peer device or other common network node, and may include many or all of the elements described above relative to the computer 120. The logical connections depicted in FIG. 3 include a local area network (LAN) 151 and a wide area network (WAN) 152, an intranet and the Internet.

When used in a LAN, the computer 120 may be connected to the LAN 151 through a network interface adapter (or "NIC") 153. When used in a WAN, such as the Internet, the computer 120 may include a modem 154 or other means for establishing communications over the wide area network 152 (e.g. Wi-Fi, WinMax). The modem 154, which may be internal or external, may be connected to the system bus 123 via the serial port interface 146 or another type of port interface. In a networked environment, at least some of the program modules depicted relative to the computer 120 may be stored in the remote memory storage device. The network connections shown are exemplary and other means of establishing a communications link between the computers may be used.

The exemplary network and the exemplary computer system described above are adapted to carry on the following:

Method for Building a Search Algorithm

Figure 4:
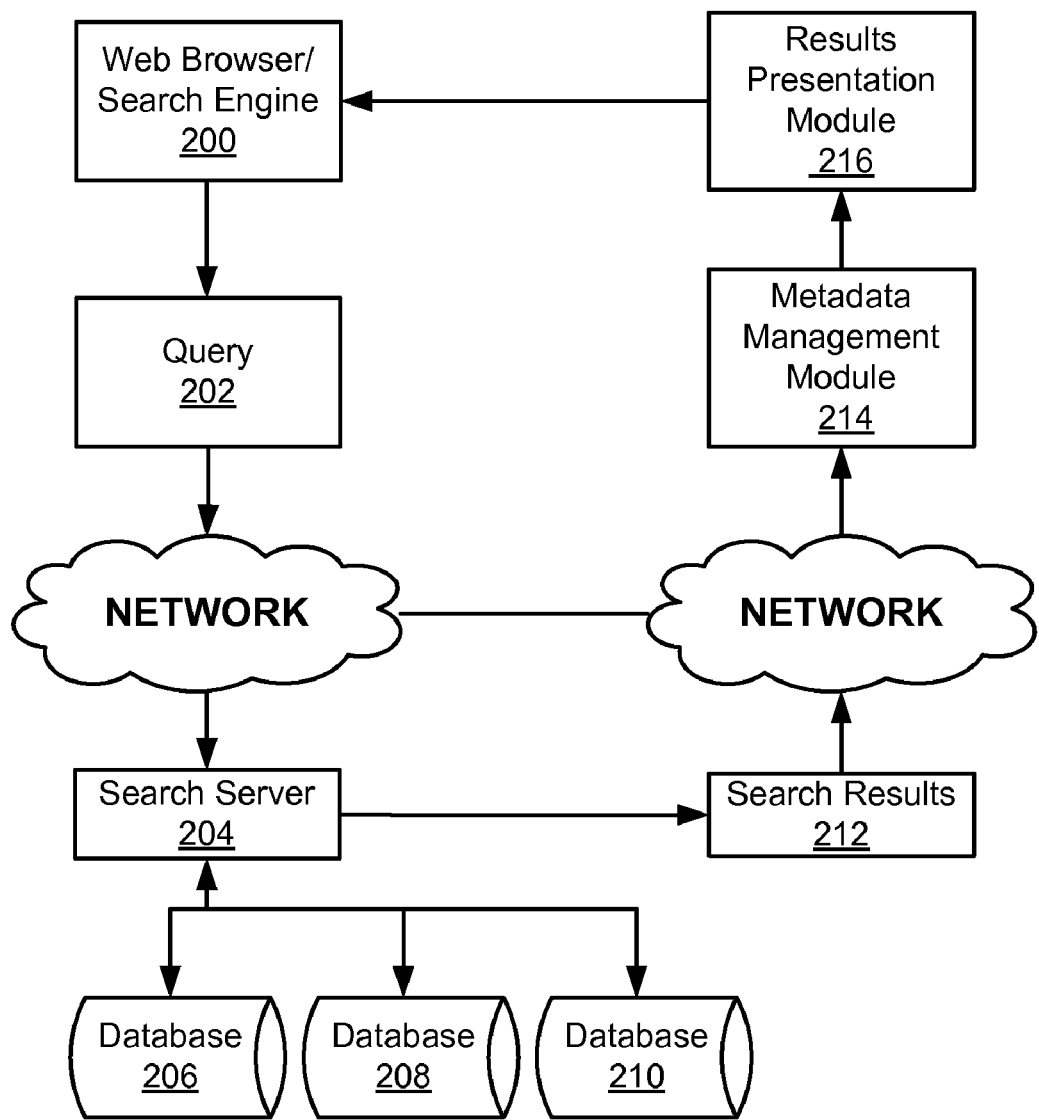
FIG. 4 is a block diagram of a search system in accordance with an embodiment of the present invention.

Turning now to FIG. 4 where is illustrated an exemplary block diagram of system adapted to build a search query and display search results. A first embodiment illustrates a web browser 200 adapted to receive a query 202 from a user. The web browser 200 communicates the query to a search server 204 that connects to various databases 206, 208, 210 that contain searchable data therein. The search server 204 provides search results 212 in accordance with the search query 202 used by the search server 204. The search results are transferred to a metadata management module 214 that screen, order and provide relevant search results metadata to the results presentation module 216. The result presentation module 216 organizes the search results and the relevant metadata in a comprehensive fashion to be presented to the user via the web browser 200.

In this embodiment the web browser 200 is used because it is the general tool to navigate the internet. The web browser 200 could alternatively be replaced in a second embodiment by a different program or interface adapted to dialogue with the user to receive search instructions from the searcher. The alternate program or interface could be designed to search specific databases or date repositories containing the desired data. The alternate program or interface could include a search engine therein adapted to manage searches.

The query 202 used by Internet search tools (e.g. like Google™.com) is normally built with key words that are used in algorithms. Each algorithm analyzes the data in a specific way attributing more or less value to each data document and their associated metadata. The search query 202 could be built at the client level or at the search server level 204 without departing from the scope of the present invention. Similarly, the search engine may be implemented on the search server 204 with trivial effects on the invention. Once the search has been performed the search results are sent to a metadata management module 214 that could either be on the server side or the client side (in a network environment). The metadata management module analyses the search results to determine which metadata is associated with which search result and is also used to determine the role and the importance of each metadata in the search algorithm to weight and order the metadata (including data in the data itself if the data is a document for instance) in a way that the user can infer the "weight" or the value given to each metadata by the algorithm. The metadata can illustratively be, inter alia, keywords in the URL, tags, attributes, keywords in the Internet page/document, links interacting with the Internet page and categories. Other ranking factors for internet search engines can be appreciated at the following internet address: http://www.vaughns-1-pagers.com/internet/google-ranking-factors.htm and additional information about metadata or meta description tag can be seen at the following internet address: http://www.searchengines.com/metadescription.html, both documents are included herein by reference.

An important role of the metadata management module 214 is to present to the user (the searcher) of the web browser/search engine 200 which metadata have the most influence on the search so that the user can provide instructions based thereon to the search engine 200 so as how to modify the search query to improve the search. Ideally, the metadata management module 214 should consider the individual metadata of each search result to allow the user to appreciate what information from each search result were considered by the algorithm. This is one way to allow the user to better understand why each search result is presented as a search result. Not all search result is pertinent to the user and the user now have the ability to inform the search engine which search result is relevant and which metadata is the most relevant. The query and the algorithm can thus be refined to refocus the next search to what the user is searching.

The results presentation module 216 is consequently adapted to display the search results to the user, via the web browser or the search engine 200, with their associated relevant metadata. The results presentation module 216 could be a web browser plug-in or a dedicated program cooperating with the search engine 200. The results presentation module 216 can illustratively present the "heavier" metadata having the most influence in the search algorithm on top of a user-selectable list and eliminate the metadata having trivial effect in the search. The user can therefore appreciate the most significant metadata associated with the results, collectively or individually, and select the most relevant ones, and the most relevant search results, to refine the search query and lunch another search.

Figure 5:
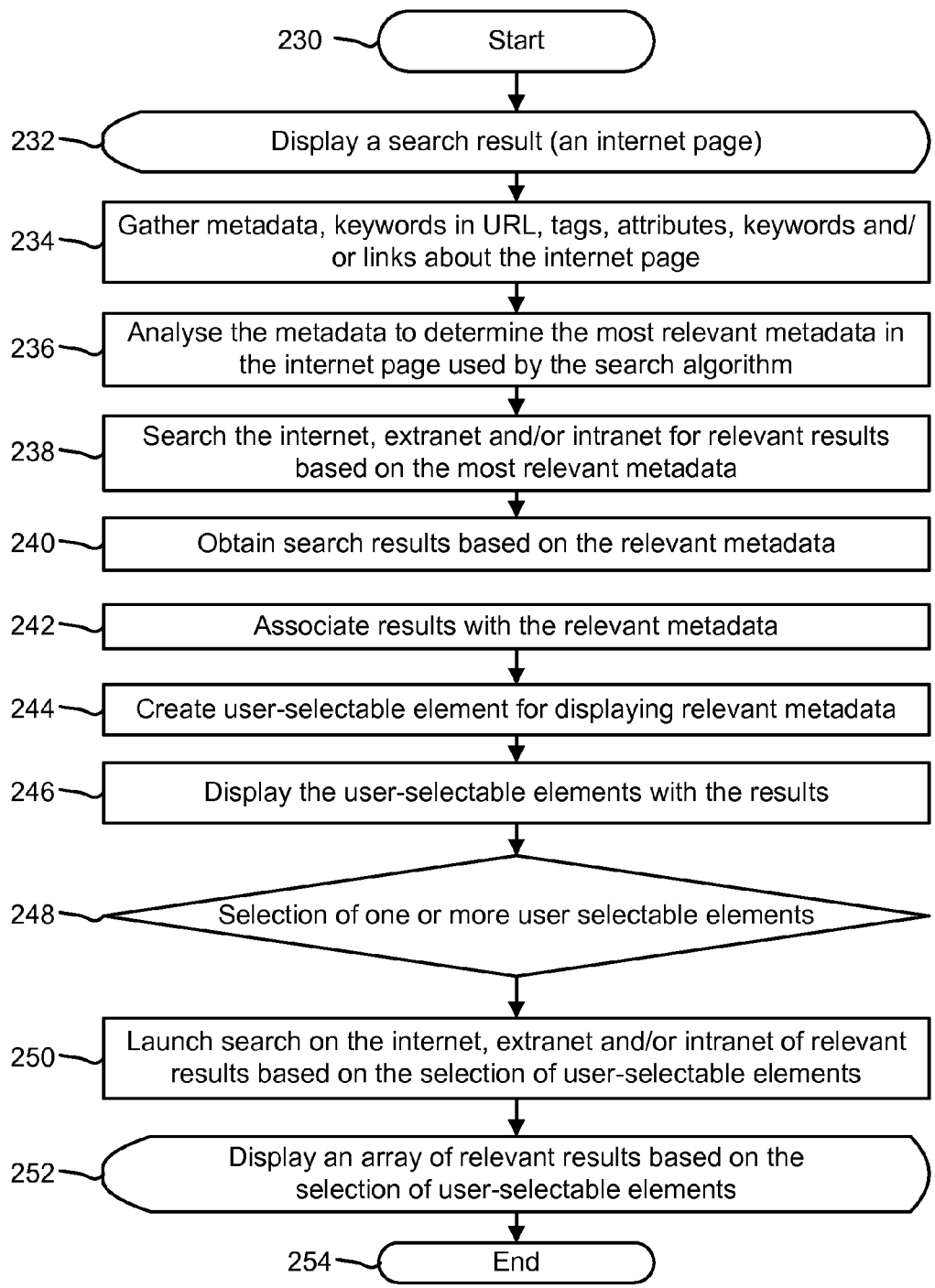
FIG. 5 is a flow chart of a series of illustrative steps in accordance with an embodiment of the present invention.

FIG. 5 is a flow chart of one exemplary way to build a search based on the metadata of a specific Internet page. It starts 230 and displays an Internet page 232. The system gathers metadata from the Internet page 234. The metadata can be imbedded in the actual Internet page or external to the Internet page. Then the system analyses 236 the metadata to find the most relevant and representative metadata used in the search algorithm about the subject Internet page. For instance, the keywords repetition in the text of the Internet page can be compared with the tags and only the tags associated with a minimum of keywords repetition will be kept as significantly representative. The most relevant metadata are to be used in a primary search 238.

The search 238 uses, at least in part, the most relevant metadata to perform a search on the Internet, an extranet and/or an intranet. Results are obtained 240 from the search 238. The results are individually associated 242 with metadata that are the most relevant to the search algorithm. This search can alternatively provide an idea of how many results are obtained for each relevant metadata (or combination of relevant metadata) and are used to help the system to give a relevancy order among the relevant metadata. The system then creates user-selectable elements 244 associated with each relevant metadata and display user-selectable elements 246. The user-selectable elements will allow a user of the system to select metadata(s) that are considered the most relevant to her/him. Preferably the user-selectable elements are displayed in relation with the Internet page (the search result) so that a user can see at the same time the Internet page and the user-selectable elements.

Step 248 requests a choice from the user. The user needs to select one (or many) user-selectable elements to alter the search algorithm based, at least in part, on the relevant metadata. If the user does not select any user-selectable element the query remains the same as a query already performed at steps 238, 240 then a new search is not necessary. In contrast, if the user has selected a combination of user-selectable elements capable of refining the search, a new query will be built and secondary search will be launched. The search 250 is performed on whatever network or database the system has access to. Results can be displayed as an array of relevant results 252 or as a listing of search results. That ends the first exemplary flowchart 254.

Figure 6:
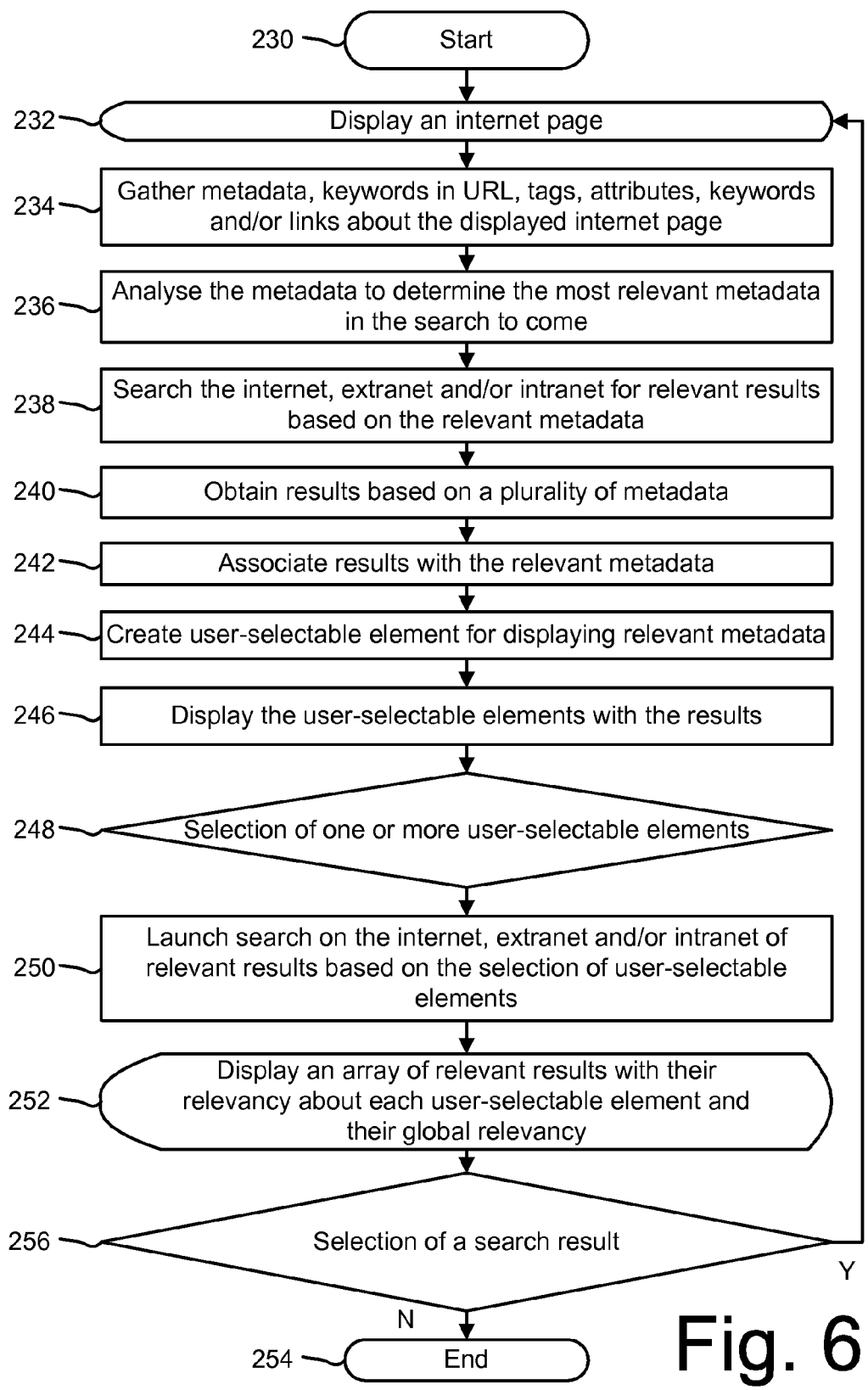
FIG. 6 is a flow chart of a series of alternate illustrative steps in accordance with an embodiment of the present invention.

FIG. 6 illustrates substantially the same process as the process of FIG. 5 although one of the results 252 provided in an array of relevant results is selected, displayed 232 and the rest of the process follows as previously explained.

Figure 7:
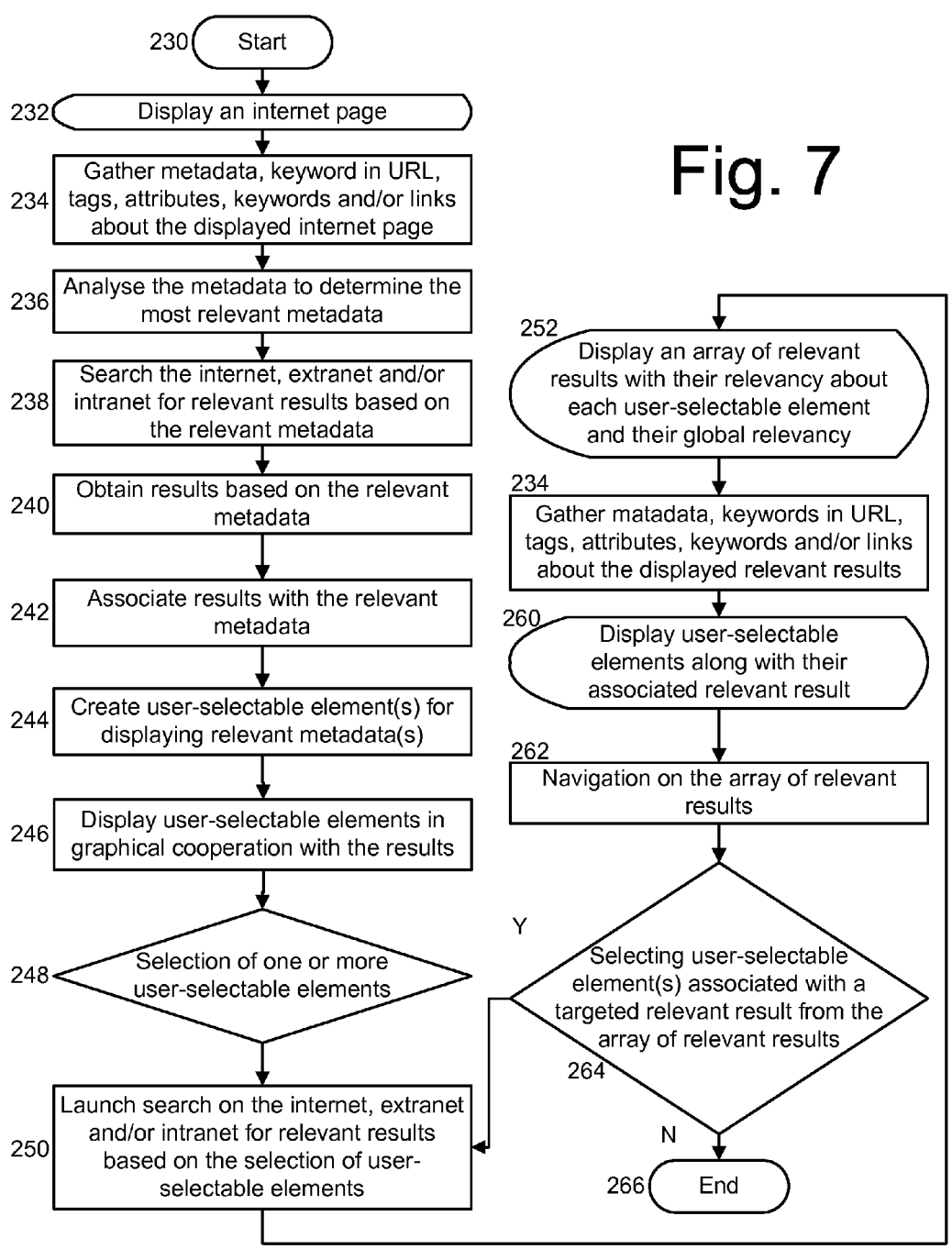
FIG. 7 is a flow chart of a series of alternate illustrative steps in accordance with an embodiment of the present invention.

Referring now to FIG. 7 wherein steps 230-252 are similar to the steps of FIG. 6. Further, the user-selectable elements are displayed in graphical cooperation with their relevant results 260. That means a user can clearly establish which user selectable element is related to each relevant search result. It could be a button disposed on the related relevant result or a link associated with the relevant result. The user can navigate along the list of results 262 and select one or many user selectable element(s) 264 that are used to launch a refined search 250. Similarly, the relevant results provided by the new search are displayed on an array of relevant results 252. The computer system then automatically retrieves metadata, keywords, tags and attributes (although not limited to this non-exhaustive list of metadata) related to the relevant results 234. The metadata are classified and the most relevant metadata is displayed 260 along with their related relevant result. The user can navigate the array of relevant results 262 to find the desired relevant result. Once the relevant result of interest is found the user can select user-selectable elements associated with another relevant result of interest to launch a further search 254 and so on so forth.

The selection of user-selectable elements can be made with logical Boolean operators (AND, OR, ANDNOT, NOT, BIGGER THAN, SMALLER THAN . . . ) to ensure accuracy of the search. When the user has selected the desired set of user-selectable elements a new search is launched and the loop restarts to provide updated relevant results based on the new set of user-selectable elements.

Turning now to FIG. 6 that illustrates a flow chart where the user-selectable elements are displayed 270, the user selects one or a few of them 272 to launch a search based on the user-selectable elements (representing metadata) 274. Results are received 276. The computer system, then, gathers metadata from the results 278. An analysis of the metadata 280 is done to use the most relevant metadata in the next steps. The analysis can be based on a number of occurrences of a word or commonalities with the parent Internet page. Other algorithms well known in the art of Internet search engines can also be used.

User selectable elements are created to represent the relevant metadata 282. The search results are preferably graphically associated with the relevant search results 284. As seen previously a search is performed based on the selection of user-selectable elements from a parent web page part of a parent array of results and the user can decide if the results provided by the new search 286 will be disposed in a new array that is displayed parallel 290 or intersecting 288 with the parent array of results and displayed 292. The user can navigate the new array of results 294 and the process restarts again if further user-selectable elements are selected.

Figure 10:
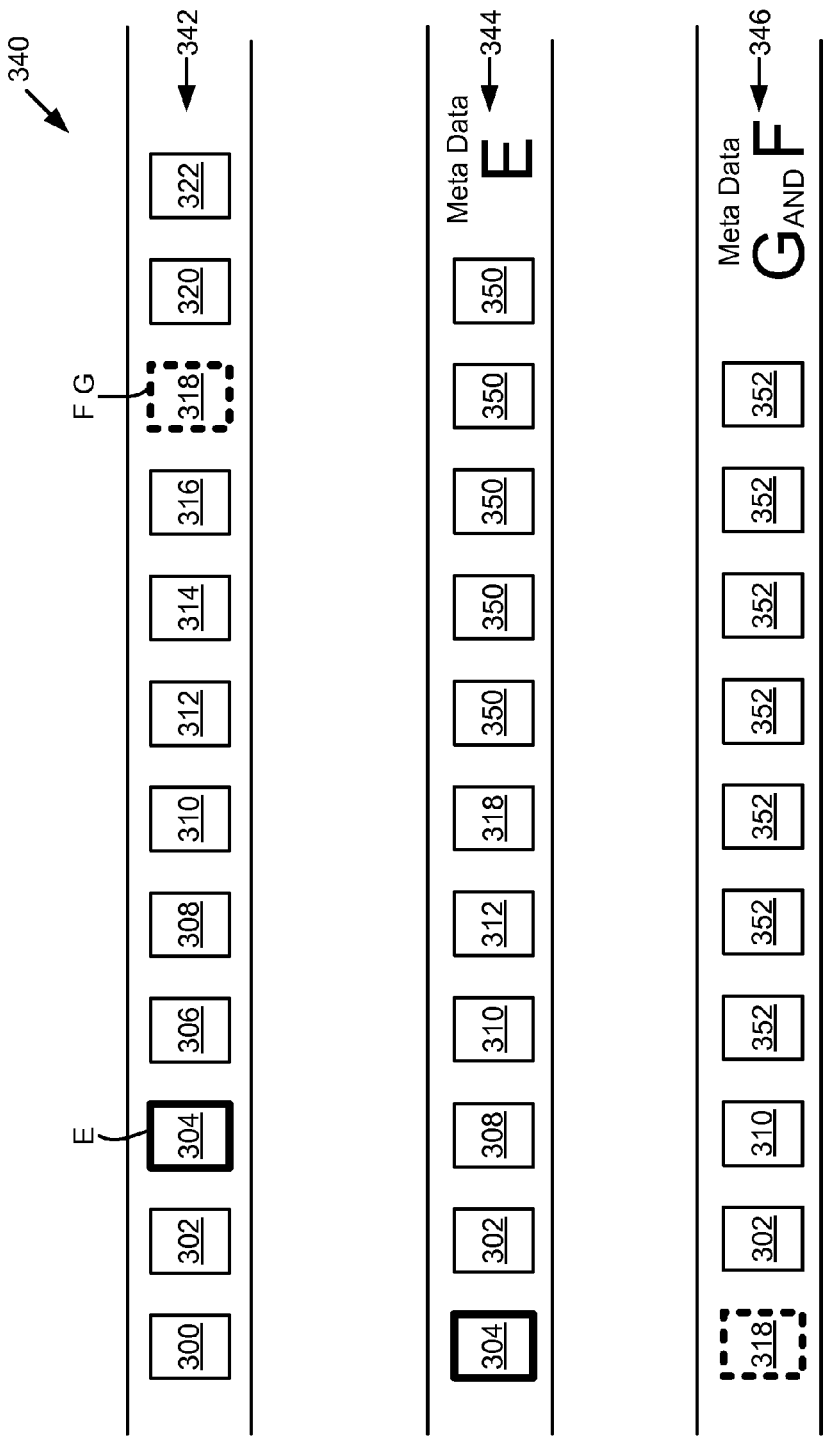
FIG. 10 is a schematic illustration of the display of search results along substantially linear arrangements of documents.

Moving to FIG. 9 it is possible to appreciate various documents 300-322, namely web pages in the present situation, associated with respective weighted and ordered metadata 330-336 as illustrated with web page 300. FIG. 10 illustrates an exemplary interface 340 disposing the search results 300-322 in an array of results that is a substantial longitudinal arrangement of documents 342. For illustrative purpose, a user selects the metadata E of document 304. A second array of documents 344 is created and displays a list of results provided by a new search that emphases metadata E. The document 304 comes first in the list 344 because it is the document from which the metadata has been selected. The following documents are illustratively, if we assume the algorithm is build as such, following document 304. Other documents 350 found in the updated search follows on the array 344. The selection of meta data by the user is considered by the search engine to modify the search algorithm and better refine the search.

Another array of results 346 is provided below where metadata F and G have been selected from document 318. Document 318 is displayed first on array 346 for the same reasons as indicated above, followed by document 302 comprising the two selected metadata and document 310 that is associated with only one of the selected metadata (G). Other relevant documents follow 352. This is an illustrative example of selected embodiments of the invention that uses a simple algorithm. Other more complicated algorithms could be used without departing from the scope of the present invention.

Figure 11:
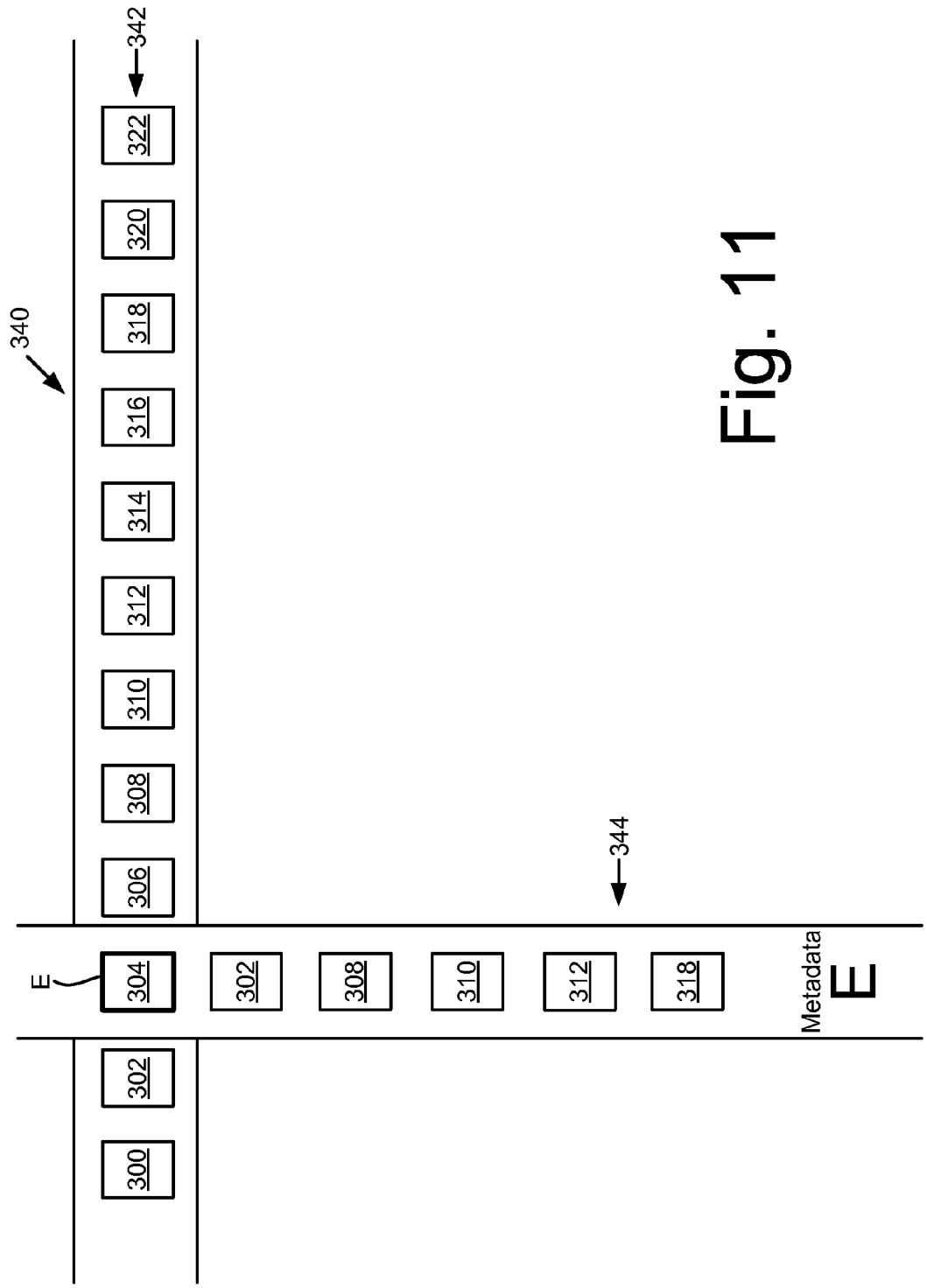
FIG. 11 is a schematic illustration of the display of search results along substantially linear arrangements of documents disposed in a non-parallel fashion.

FIG. 11 illustrates two intersecting arrays of document 342 and 344 similar to the arrays of documents of FIG. 10. However, one can appreciate that the two arrays 342 and 344 are intersecting at document 304. The intersection occurs at document 304 because document 304 is the selected document as previously explained. Other relevant documents on array 344 are disposed along the array in accordance with their relevancy with the used algorithm. This is a way to graphically represent the relations between the different searches that allow the user to navigate along the arrays while still keeping in sight the path along which the search has evolved. Here again the illustrated example of FIG. 11 is one among other possible representations and is not intended to limit the scope of the invention but rather show how the search results might be displayed and how the refined search results could be illustrated in conjunction with the "parent" search results. Many other additional parameters could be considered by the search algorithm and have an effect on the choice of results and their distribution in the listing of search results.

Method for Linking Documents with an Object

It is sometimes desirable to draw a link between an object and related documents. In other words, starting from a visual rendering of an object it is desirable to retrieve documents related to the object in a graphical fashion. This is useful, for instance, in the case of a product that has portions thereof covered by patents. By having a look on the image of the product, one is capable of easily and intuitively retrieving patent documents related to a specific portion of the object by using a graphical link disposed on the object. The opposite is also true. From a document one is capable to retrieve the image of the object and see on the object where the document is the most relevant.

Figure 12:
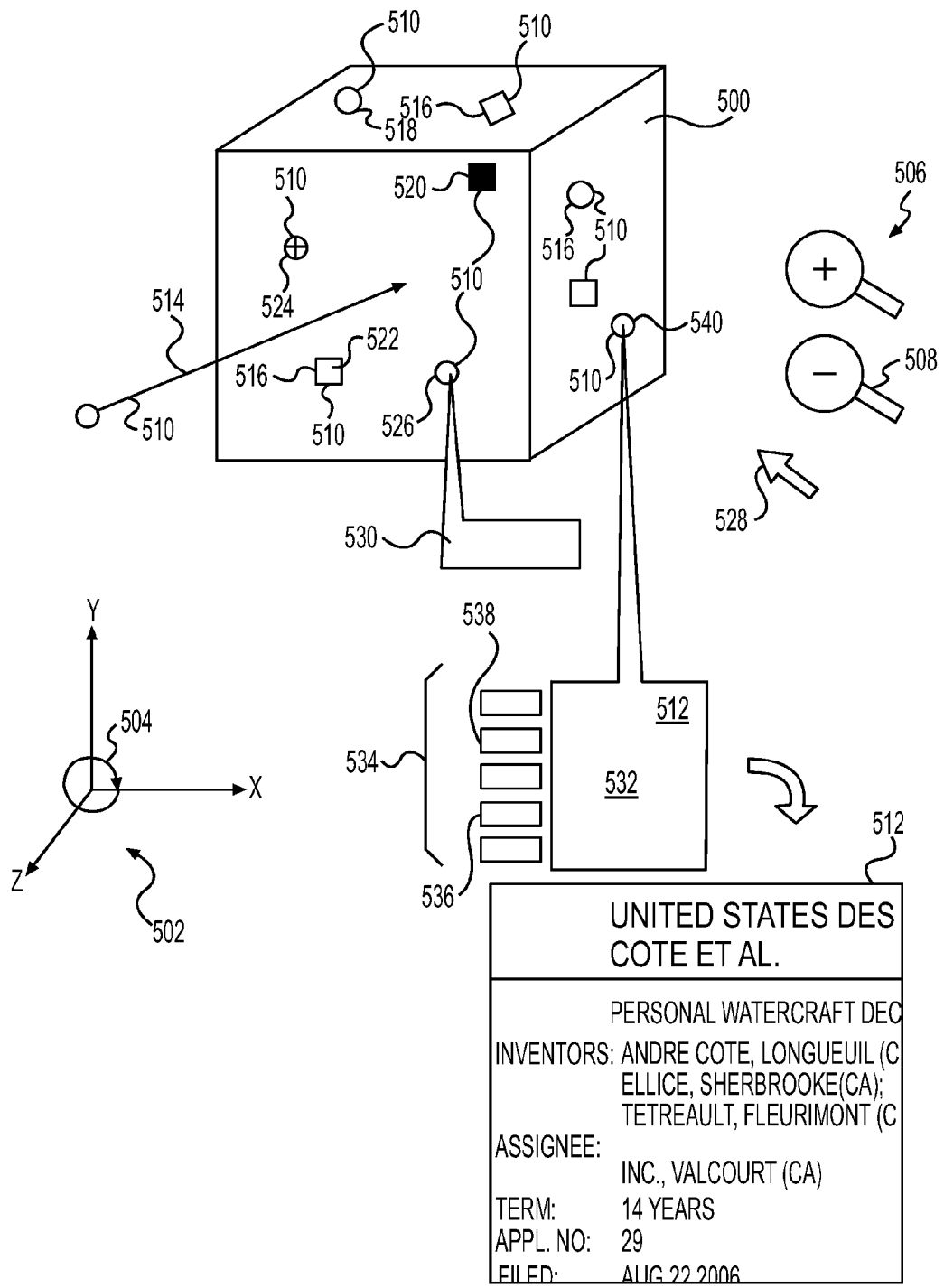
FIG. 12 is a schematic illustration of a three dimensional product with visual marks thereon (pinpoints) leading to related documents.

FIG. 12 illustrates schematically an object 500 represented in three dimensions (X, Y, Z) 502. The object 500 can be rotated 504 about the various dimensions 502 to provide the best view of a portion of the object to a user. The object 500 can be magnified 506 or reduces in size to provide a view that provides the desired level of details.

The schematic illustrative object 500 can be an isometric view, a perspective view, a three-dimensional image or an avatar, without departing from the scope of the present invention. A two-dimensional image, a sectional view, an isometric or perspective view is also encompassed by the present invention.

A plurality of pinpoints 510 is disposed on the object 500. Pinpoints 510 are marks, having the shape of pins or not, that are disposed on the object. These pinpoints 510 are disposed on a precise location of the object to illustrate there is something related to this precise location that is available to the user. In the present embodiment, pinpoints 510 are disposed on the object 500 as a graphical link to a document 512. The link is also established the other way around between the document 512 and the object 500. The pinpoint 510 and the links between documents 512 are managed by an interface that allows the creation, change locations of the pinpoints 510 on the object and modify the link therebetween. Once a pinpoint 510 is disposed on the object 500 it can eventually be moved or erased if not useful anymore. When there is a little space available or when a section of the object is too crowded to ensure proper visibility of the pinpoint 510 a lead 514 can be used to show where the pinpoint 510 is directed on the object 500.

The pinpoints 510 can have different shapes, colors and sizes to help a viewer to distinguish pinpoints 510 sharing a commonality. These pinpoints "visual distinctive features" are associated with the pinpoint 510 when the pinpoint 510 is created or after when the pinpoint 510 is already on the object 500. The visual distinctive features are illustratively assigned to an attribute defining the document 512. Thus, a viewer can distinguish all pinpoints 510 associated with documents and having the same attribute in a glimpse of an eye.

In the present example pinpoints 510 have either a square 516 shape or a circular shape 518. The color of the pinpoints 510 can also be used to discriminate the pinpoints 510. In the present example we have a dark color 520 and a light color 522. Other signs 524 and variations are encompassed by the present invention.

Various actions on a pinpoint 510 would lead to different interactions with the document 512 associated therewith. For example, the pointing device 528 of a computer system enabling the interface carrying the present embodiment could hover over one pinpoint 510, 526 to show a summary 530 of the document 512. A simple click (selection) of the pinpoint 540 leads to a thumbnail view 532 of the document 512. The thumbnail view 532 can be associated with a set of attributes/tags 534 associated with the document 512. Each attribute from the set of attributes 534 is selectable and lead to some other related documents/objects. For instance, if attribute 536 is the name of the creator of the document 512 a selection of attribute 536 will lead to other documents from the same creator. The selection of attribute 536 could alternatively hi-light other pinpoints from the same creator. Other alternative actions are encompassed by the present invention. Similarly, if attribute 538 were one of the mechanical systems of the object to which the document 512 pertains, in the present situation the seat of a personal watercraft, a selection of attribute 538 would lead to documents related to seats. The same dynamic can be applied with almost infinite variations depending on the object and the documents. A double click on the pinpoint 540 launches the program to see the document 512 and possibly edit it. The aforementioned description illustrates one embodiment among other possible alternate embodiments.

Figure 13:
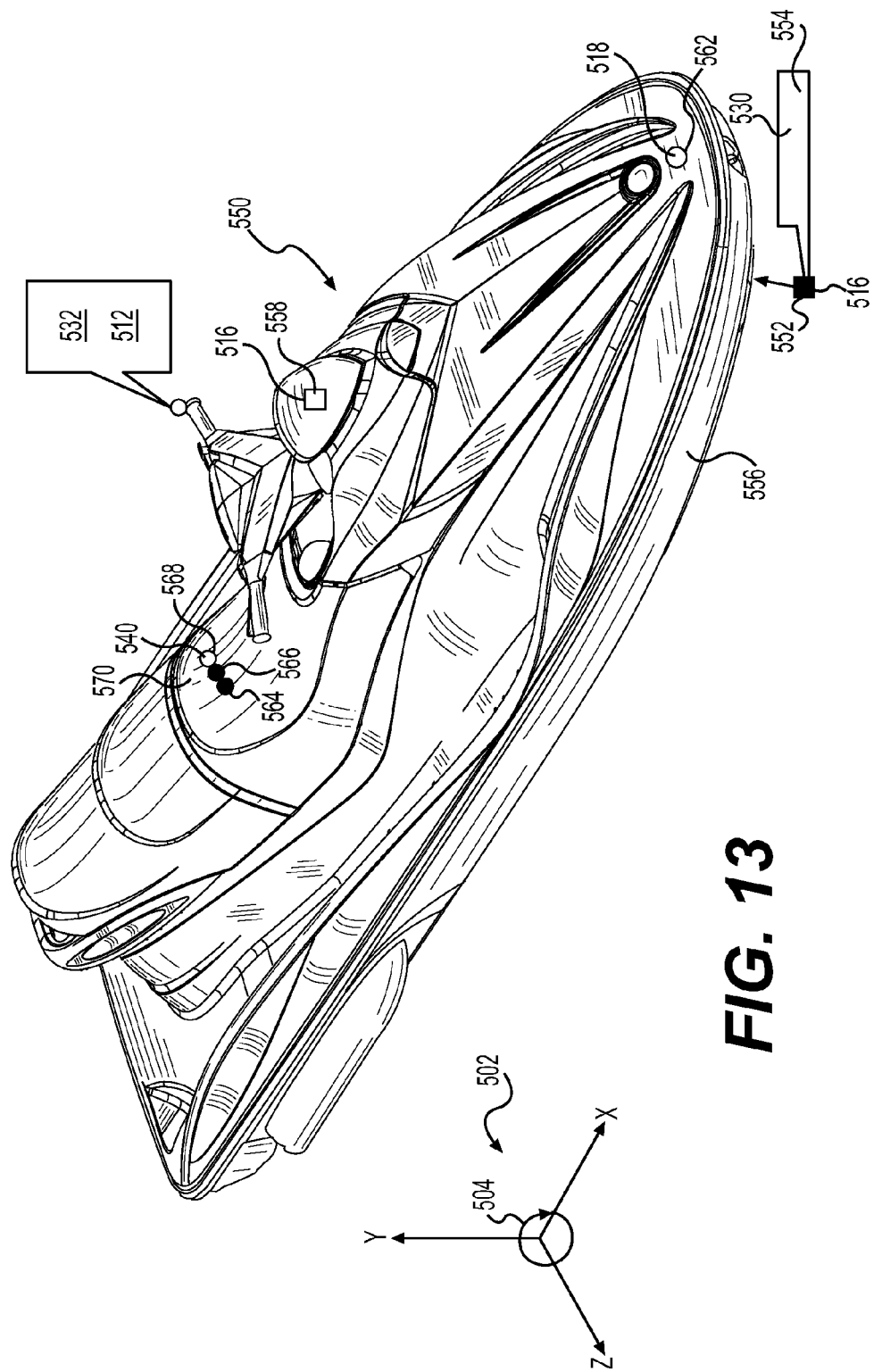
FIG. 13 illustrates an isometric view of a product, e.g. a personal watercraft, with visual marks thereon.

FIG. 13 is an illustrative application of the method and the interface presented above using a personal watercraft 550 depicted on a perspective view. Square pinpoints 516 are illustratively associated with engineering documents and circular pinpoints 518 are associated with patent documents. Hovering the pointer 528 over pinpoint 552 will display an engineering report 554 (square pinpoints related to reports are in dark color) about the shape of the hull 556. A double click on the pinpoint 552 opens the report. Pinpoint 558 is an engineering document related, for example, to the plastic used for manufacturing the cover 560 of the watercraft 550.

Still referring to FIG. 13, circular pinpoint 562 disposed on the forward portion of the watercraft 550 is a patent disclosing (pinpoints related to disclosures are in light color) a hinge of a watercraft 550. Pinpoints 564, 566, 568 are illustrating there are three patent documents related to the seat 570 of the watercraft 550. Pinpoints 564 and 566 are in dark color and use a round shape (e.g. round=patent; dark=claimed subject matter). The dark color of pinpoints 564, 566 is associated with what is claimed therefore the two round and dark pinpoints 564, 566 indicate there are two patents claiming something about the seat 570 of the watercraft 550. The position of the pinpoints on the object, in this case the watercraft 550, is an insightful indication of the targeted portion of the patents and the reports thereon.

Figure 14:
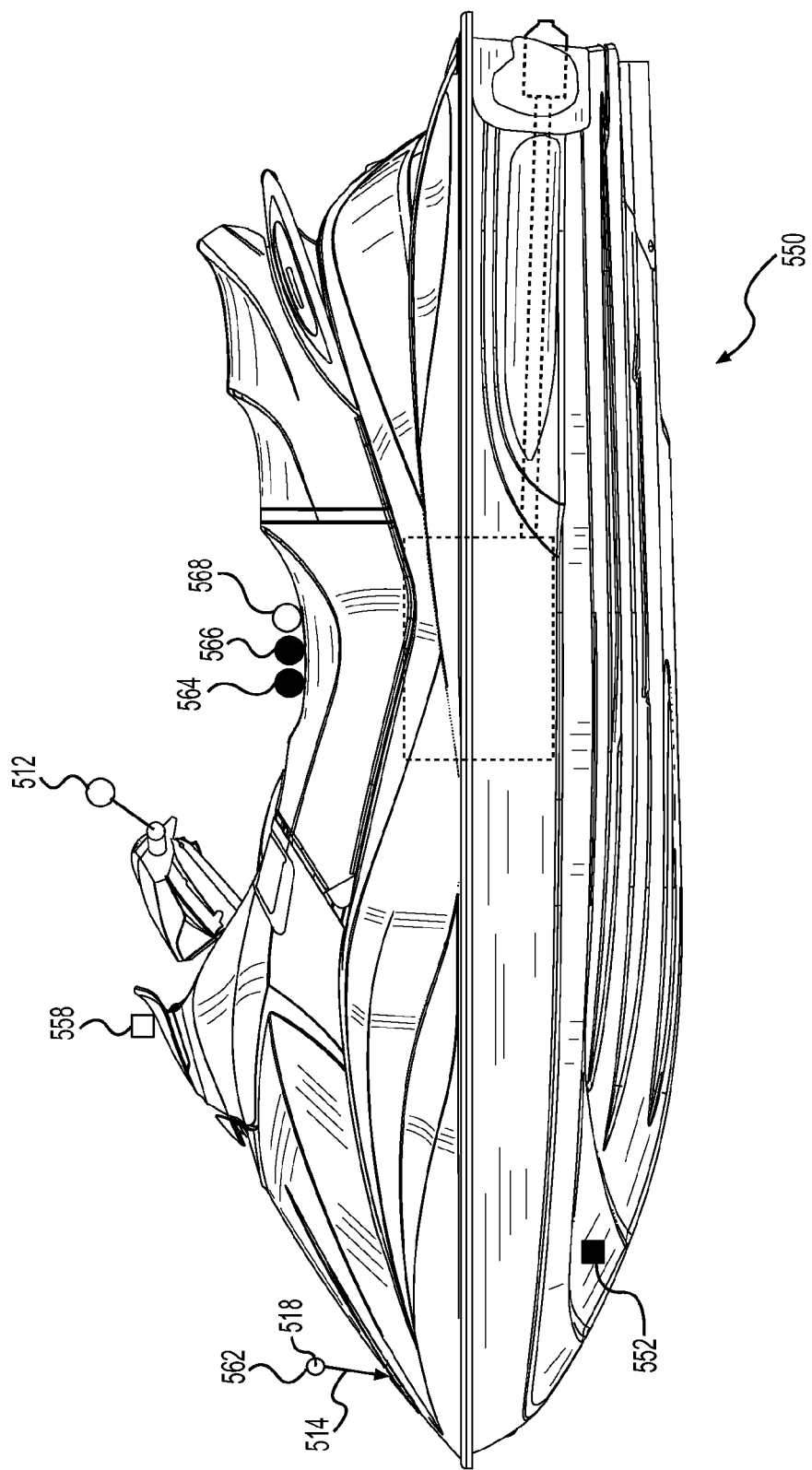
FIG. 14 illustrates a left elevational side view of the product of FIG. 13 with visual marks thereon.
Figure 15:
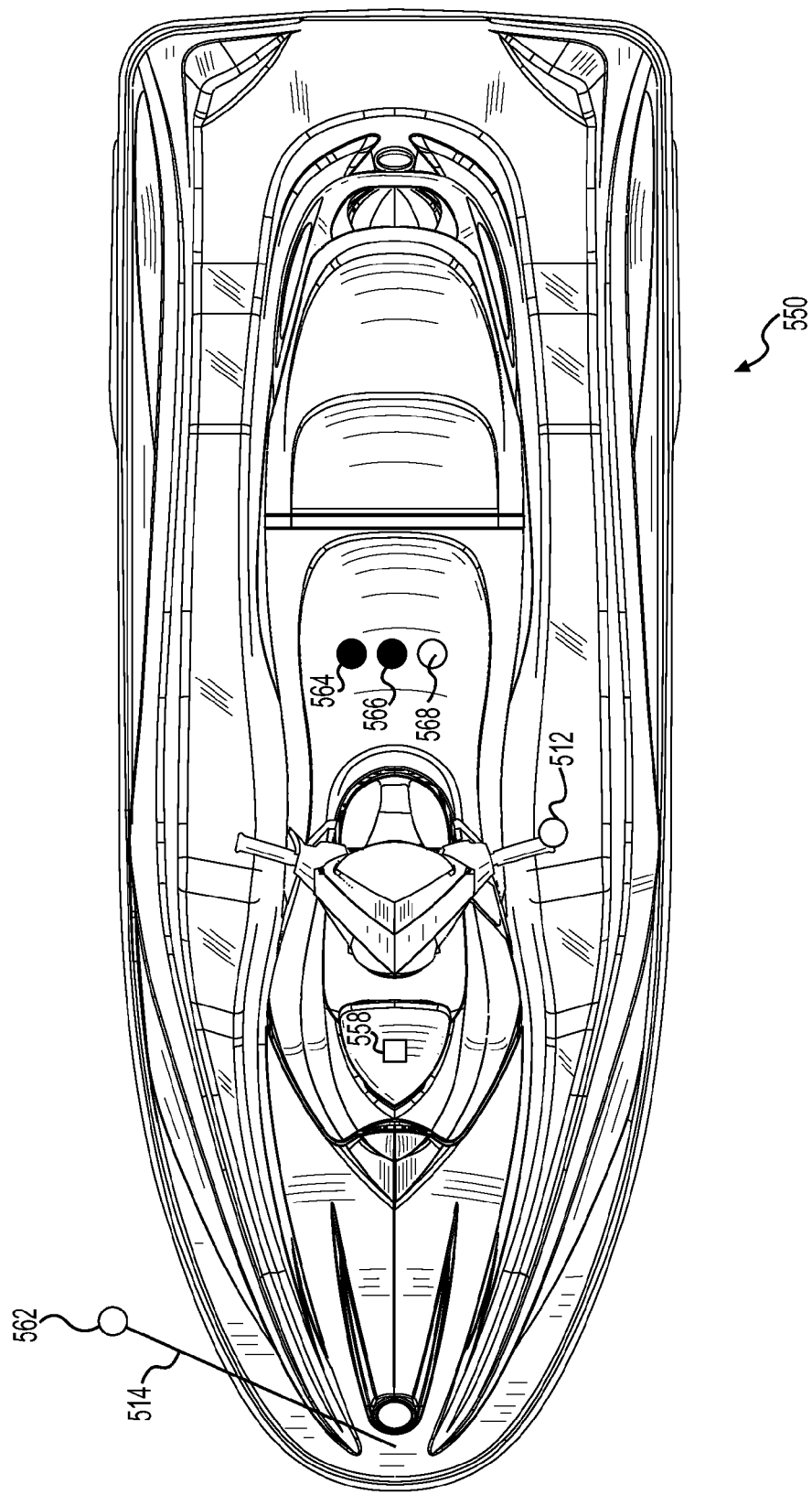
FIG. 15 illustrates a top plan view of the product of FIG. 13 with visual marks thereon.
Figure 16:
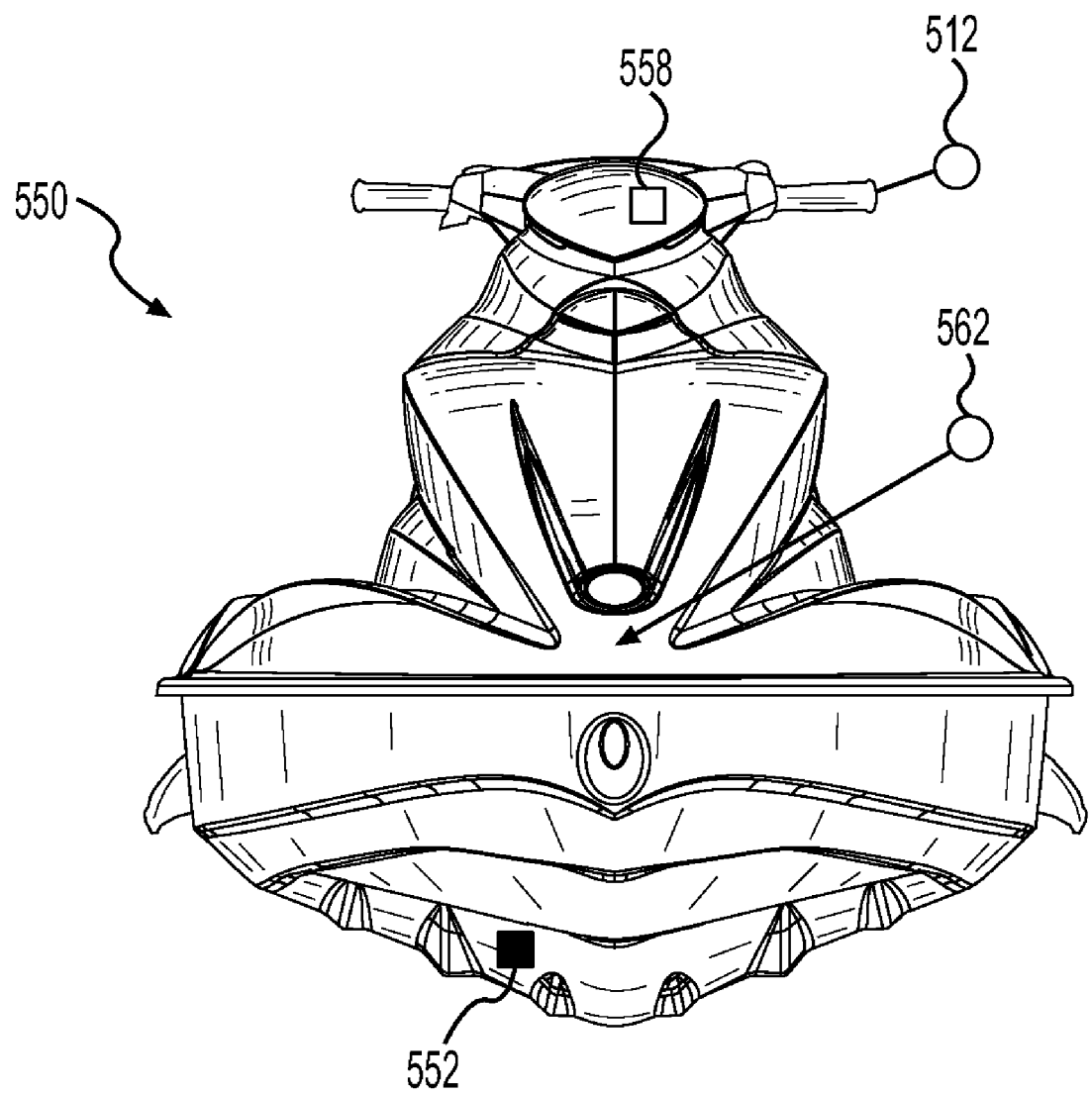
FIG. 16 illustrates a top plan view of the product of FIG. 13 with visual marks thereon.

Other views of the same object 550 are available to ensure the best visualization of the object and the best localization of the pinpoints. The user can switch from one view to other views as desired. FIG. 14 illustrates a corresponding left side elevational view of the watercraft 550, FIG. 15 a corresponding top plan view and FIG. 16 a corresponding front elevational view of the same watercraft 550. A link to complementary views can be used on each view to help a user gets to related images of the object.

Figure 17:
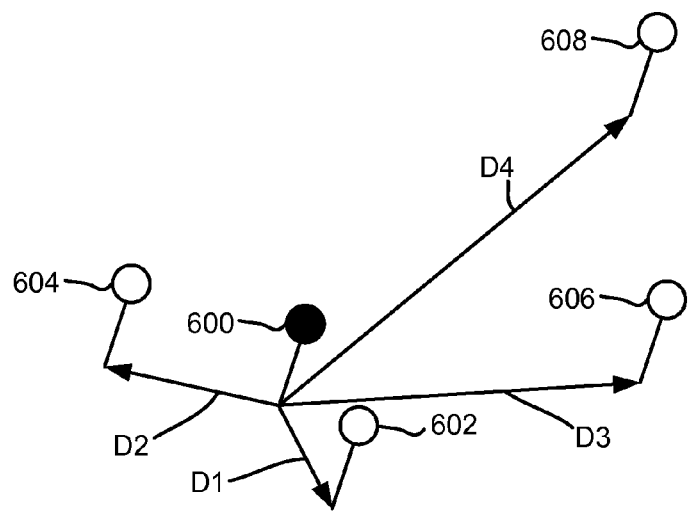
FIG. 17 illustrates incremental distance between pinpoints (or visual distinctive elements) on an object.
Figure 18:
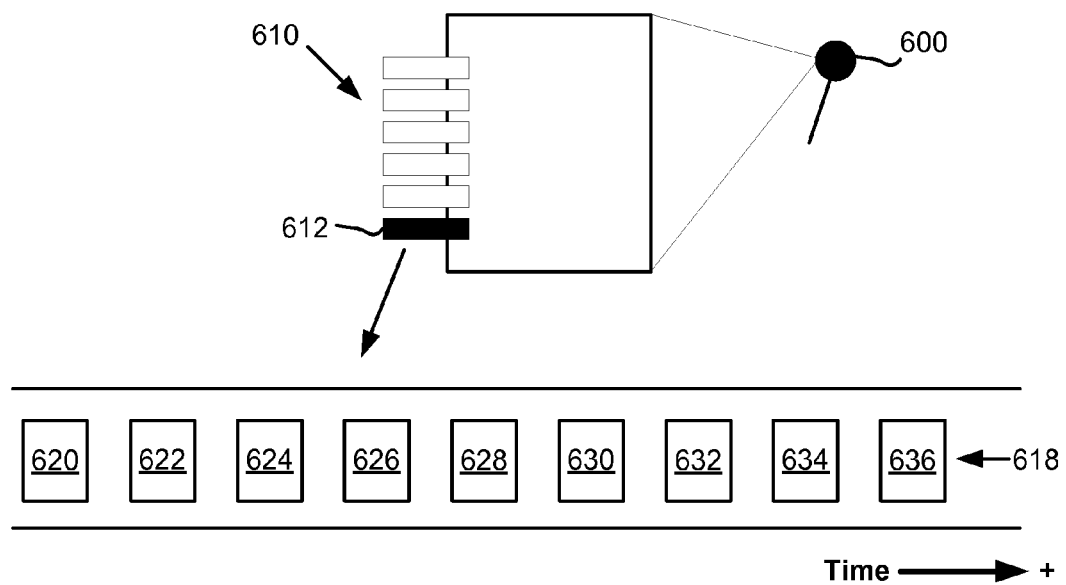
FIG. 18 illustrates a document associated with a pinpoint, the document displaying selectable associated attributes leading to other documents.

As illustrated on FIG. 17, one attribute associated with a document can lead to other documents based on the graphical proximity of their associated pinpoints disposed on the object. In other words, relevancy of pinpoints, or their related document, can be based on the physical distance from a subject pinpoint. In the present illustrative embodiment, the subject pinpoint 600 is closer D1 to pinpoint 602, then a bit further D2 to pinpoint 604, D3 with pinpoint 606 and finally from pinpoint 608 with distance D4. The pinpoint distance based search would give the following result order 602, 604, 606 and 608 according to the respective increasing distance. The first document provided will be the document associated with the closest pinpoint 602 from the subject pinpoint 600, the second document will be the document associated with the second closest pinpoint 604 and so on so forth. All documents can be ordered on an array of documents in accordance with the distance as illustrated on FIG. 18. This can be called proximity discrimination.

When the interface is used specifically for patents, each element of the bibliographic data from a patent can be represented as an attribute 610 and therefore it is possible to retrieve, for example, all patent documents from a specific assignee 612 starting from a pinpoint 600 applied on the image of a product. The selection of the pinpoint leads to a view 618 of the patent document with selectable attributes 610 associated therewith. A selection of the attribute "assignee" 612 leads to the patent documents from the same assignee. All documents 620-636 can be disposed along a chronological order if desired. The illustrative example is directed to patents but could be performed with other types of information like technical documents, maintenance documents directed to specific portions of an aircraft (for instance).

The description and the drawings that are presented above are meant to be illustrative of the present invention. They are not meant to be limiting of the scope of the present invention. Modifications to the embodiments described may be made without departing from the present invention, the scope of which is defined by the following claims:

What is claimed is:

1. A non-transitory computer-readable medium having stored thereon computer-readable instructions that, when executed by a computer, cause the computer to perform operations for managing documents in relation with representations of objects displayed with a computer, the operations comprising:

providing a plurality of representations of objects for a user to choose from;

selecting a representation of an object among the plurality of provided representations of objects on a basis of an action performed by the user;

displaying the selected virtual representation of the object;

providing a plurality of documents for the user to choose from;

selecting at least one document among the plurality of documents on a basis of an action performed by the user;

analyzing the content of the selected at least one document to determine a concept of that selected at least one document; determining an object that matches the determined concept; mapping the selected at least one document and any documents that are related to the selected at least one document onto the determined object;

providing at least one graphical element adapted to be associated with the selected at least one document;

selecting a graphical element on a basis of an action performed by the user;

associating the graphical element in graphical relation with the selected representation of the object at a location thereof on a basis of an action performed by the user; and displaying the representation of the object with the associated graphical element to provide a link between the representation of the object, the location of the associated graphical element and the selected at least one document, whereby a user can associate documents with respective related locations on graphical representations of objects and retrieve documents on a basis of an interaction with graphical elements on a basis of locations about representations of objects.

2. The non-transitory computer-readable medium of claim 1, wherein the location associated with the representation of the object is an attribute of the document, the attribute being representative of a location about the represented object.

3. The non-transitory computer-readable medium of claim 1, wherein the graphical element is adapted to be associated with an attribute adapted to visually distinguish the graphical element associated with the attribute from graphical elements not associated with the attribute.

4. The non-transitory computer-readable medium of claim 1, wherein the graphical element is adapted to provide information related to the document on a basis of a user interaction with the graphical element.

5. The non-transitory computer-readable medium of claim 1, wherein a plurality of graphical elements are disposed in relation with the representation of the object, at least some of the graphical elements being associated with documents, wherein graphical elements are adapted to be associated with attributes searchable to retrieve documents on a basis of locations.

6. The non-transitory computer-readable medium of claim 1, wherein the selected document is adapted to be associated with a plurality of attributes and wherein at least one of the plurality of attributes is adapted to be associated with a visual distinctive feature applicable to the graphical element associated with the document to further distinguish the graphical element displayed in association with the representation of the object.

7. The non-transitory computer-readable medium of claim 1, wherein the representation of the object is a three-dimensional representation of the object adapted to be virtually manipulated by a user to provide a plurality of view points to a user for interacting with graphical elements disposed at various locations not simultaneously visible with a single view point of the three-dimensional representation of the object.

8. The non-transitory computer-readable medium of claim 1, wherein a determination of related documents is adapted to be made on a basis of distances between graphical elements displayed in relation with the representation of the object.

9. The non-transitory computer-readable medium of claim 1, wherein documents are adapted to be sorted on a basis of distances between their respective graphical elements respectively located on the representation of the object.

10. A device, comprising a processor configured to present a graphical user interface for displaying graphical elements in relation with representations of objects, the graphical interface comprising areas adapted to provides the operations comprising:

providing a plurality of representations of objects for a user to choose from;

selecting a representation of an object among the plurality of provided representations of objects on a basis of an action performed by the user;

displaying the selected virtual representation of the object;

providing a plurality of documents for the user to choose from;

selecting at least one document among the plurality of documents on a basis of an action performed by the user;

analyzing the content of the selected at least one document to determine a concept of that selected at least one document; determining an object that matches the determined concept; mapping the selected at least one document and any documents that are related to the selected at least one document onto the determined object;

providing at least one graphical element adapted to be associated with the selected at least one document;

selecting a graphical element on a basis of an action performed by the user;

associating the graphical element in graphical relation with the selected representation of the object at a location thereof on a basis of an action performed by the user; and displaying the representation of the object with the associated graphical element to provide a link between the representation of the object, the location of the associated graphical element and the selected at least one document associated with the graphical element, whereby a user can associate documents with respective related locations on graphical representations of objects and retrieve documents on a basis of an interaction with graphical elements on a basis of locations.

11. The device of claim 10, wherein the location associated with the representation of the object is an attribute of the document, the attribute being representative of a location about the represented object.

12. The device of claim 10, wherein the graphical element is adapted to be associated with an attribute adapted to visually distinguish the graphical element associated with the attribute from graphical elements not associated with the attribute.

13. The device of claim 10, wherein the graphical element is adapted to provide information related to the document on a basis of a user interaction with the graphical element.

14. The device of claim 10, wherein a plurality of graphical elements are disposed in relation with the representation of the object, at least some of the graphical elements being associated with documents, wherein graphical elements are adapted to be associated with attributes searchable to retrieve documents on a basis of locations.

15. The device of claim 10, wherein the selected document is adapted to be associated with a plurality of attributes and wherein at least one of the plurality of attributes is adapted to be associated with a visual distinctive feature applicable to the graphical element associated with the document to further distinguish the graphical element displayed in association with the representation of the object.

16. The device of claim 10, wherein a determination of related documents is adapted to be made on a basis of distances between graphical elements displayed in relation with the representation of the object.

17. The device of claim 10, wherein documents are adapted to be sorted on a basis of distances between their respective graphical elements respectively located on the representation of the object.

18. A method comprising:
providing a plurality of representations of objects for a user to choose from;
selecting a representation of an object among the plurality of provided representations of objects on a basis of an action performed by the user;
displaying the selected virtual representation of the object;
providing a plurality of documents for the user to choose from;
selecting at least one document among the plurality of documents on a basis of an action performed by the user;
analyzing the content of the selected at least one document to determine a concept of that selected at least one document; determining an object that matches the determined concept; mapping the selected at least one document and any documents that are related to the selected at least one document onto the determined object;
providing at least one graphical element adapted to be associated with the selected at least one document;
selecting a graphical element on a basis of an action performed by the user;
associating the graphical element in graphical relation with the selected representation of the object at a location thereof on a basis of an action performed by the user; and
displaying the representation of the object with the associated graphical element to provide a link between the representation of the object, the location of the associated graphical element and the selected at least one document associated with the graphical element,
whereby a user can associate documents with respective related locations on graphical representations of objects and retrieve documents on a basis of an interaction with graphical elements on a basis of locations about representations of objects.

19. The method of claim 18, wherein the location associated with the representation of the object is an attribute of the document, the attribute being representative of a location about the represented object.

20. The method of claim 18, wherein documents are adapted to be sorted on a basis of distances between their respective graphical elements respectively located on the representation of the object.

* * * * *